United States Patent
Ma et al.

(10) Patent No.: US 11,277,182 B2
(45) Date of Patent: Mar. 15, 2022

(54) HYBRID BEAM FORMING ARCHITECTURE-BASED CALIBRATION COMPENSATION METHOD AND APPARATUS

(71) Applicant: DATANG MOBILE COMMUNICATIONS EQUIPMENT CO., LTD., Beijing (CN)

(72) Inventors: Jingyan Ma, Beijing (CN); Shihua Wang, Beijing (CN); Tao Duan, Beijing (CN); Jian Wu, Beijing (CN); Yongli Zhang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 17/435,919

(22) PCT Filed: Mar. 4, 2020

(86) PCT No.: PCT/CN2020/077852
§ 371 (c)(1),
(2) Date: Sep. 2, 2021

(87) PCT Pub. No.: WO2020/187033
PCT Pub. Date: Sep. 24, 2020

(65) Prior Publication Data
US 2022/0045728 A1    Feb. 10, 2022

(30) Foreign Application Priority Data
Mar. 15, 2019   (CN) .......................... 201910197154.7

(51) Int. Cl.
*H04B 7/06*   (2006.01)
(52) U.S. Cl.
CPC ......... *H04B 7/0617* (2013.01); *H04B 7/0634* (2013.01)

(58) Field of Classification Search
CPC .......................... H04B 7/0617; H04B 7/0634
See application file for complete search history.

(56) References Cited

U.S. PATENT DOCUMENTS 9,407,336 B2   8/2016   Kim et al.
10,979,193 B2   4/2021   Liu et al.
(Continued)

FOREIGN PATENT DOCUMENTS

CN   104919715 A   9/2015
CN   107135023 A   9/2017
(Continued)

OTHER PUBLICATIONS

CMCC, Hybrid Beamforming for Massive MIMO, 3GPP TSG RAN WG1 #85, R1-164893, May 27, 2016, 5 pages.
(Continued)

*Primary Examiner* — Kenneth T Lam
(74) *Attorney, Agent, or Firm* — Meunier Carlin & Curfman LLC

(57) ABSTRACT

The present application relates to the field of communications, and in particular to a hybrid beam forming architecture-based calibration compensation method and apparatus for improving the accuracy and effectiveness of calibration compensation. The method comprises: a base station determining a preset calibration weight vector matrix W and a preset first calibration signal matrix S, then transmitting N times consecutively calibration signals through analog transmission channels, calculating, according to the calibration weight vector matrix W, the first calibration signal matrix S and a first received data vector matrix $Y_{TX}$, a transmission channel error matrix $E_{TX}$, and then performing error compensation on the analog transmission channels based on $E_{TX}$.

20 Claims, 7 Drawing Sheets

(56) References Cited

U.S. PATENT DOCUMENTS

| | | | | |
|---|---|---|---|---|
| 2006/0133535 A1* | 6/2006 | Jung | ................... | H04B 7/0617 |
| | | | | 375/296 |
| 2010/0008406 A1* | 1/2010 | Sawai | ................... | H04B 17/21 |
| | | | | 375/219 |
| 2016/0269090 A1* | 9/2016 | Kim | ...................... | H04B 7/046 |
| 2017/0033852 A1* | 2/2017 | Kim | ................... | H04B 7/0456 |
| 2017/0163327 A1* | 6/2017 | Yang | ........................ | H04L 5/14 |
| 2018/0102827 A1* | 4/2018 | Noh | ................... | H04B 7/0404 |
| 2018/0212664 A1 | 7/2018 | Kim et al. | | |

FOREIGN PATENT DOCUMENTS

| | | |
|---|---|---|
| CN | 108155958 A | 6/2018 |
| CN | 108282211 A | 7/2018 |
| WO | 2015156496 A2 | 10/2015 |

OTHER PUBLICATIONS

English Translation of Written Opinion issued in PCT/CN2020/077852, dated May 27, 2020.

\* cited by examiner

HYBRID BEAM FORMING ARCHITECTURE-BASED CALIBRATION COMPENSATION METHOD AND APPARATUS

CROSS-REFERENCE OF RELATED APPLICATIONS

This application is a national phase entry under 35 U.S.C. § 371 of International Application No. PCT/CN2020/077852, filed on Mar. 4, 2020, which claims the priority from Chinese Patent Application No. 201910197154.7, filed with the China National Intellectual Property Administration on Mar. 15, 2019 and entitled "Hybrid Beam Forming Architecture-Based Calibration Compensation Method and Apparatus", the entire contents of which are hereby incorporated by reference.

FIELD

The present application relates to the field of communication technologies, and particularly to a hybrid beam forming architecture-based calibration compensation method and apparatus.

BACKGROUND

The hybrid beam forming architecture is one of key technologies of the large-scale antenna array of Fifth Generation (5G) millimeter wave. This architecture can effectively utilize the advantages of digital beamforming and analog beamforming, and use less hardware cost to achieve the performance close to that of the digital beamforming. How to achieve the calibration compensation for the amplitude and phase of each channel, to ensure the effectiveness of the antenna array beamforming function under the hybrid beamforming architecture is an important issue that the 5G technology needs to face and solve.

The existing solutions are generally based on the pure digital beamforming architecture, where a single digital channel is connected to a single analog channel, that is, one digital channel corresponds to one analog channel. The channel estimation is performed by calculating the amplitude and phase differences between the transmitted calibration signal sequence and the received calibration signal sequence, and then the calibration compensation is performed on the channel estimation result in the digital baseband processing part. However, for the hybrid beamforming architecture that combines the digital beamforming and analog beamforming, since one digital channel corresponds to multiple analog channels, calibration compensation needs to be performed on multiple analog channels, corresponding to each digital channel, respectively when the calibration compensation is performed, that is, in the case of multiple digital channels, it is necessary to switch the switch state of the calibration port of each analog channel many times to complete the amplitude and phase error estimation and calibration compensation of each group of analog channels. Therefore, this method not only has a large quantity of switching times, but also the amplitude and phase differences of the analog channels in each group need to be calculated for each switching, which takes up a lot of computing resources and is difficult to use directly.

BRIEF SUMMARY

A hybrid beam forming architecture-based calibration compensation method includes:

determining, by a base station, a preset calibration weight vector matrix W and a preset first calibration signal matrix S, wherein $W^H W = N I_N$, $S^H S = N I_P$, $I_N$ and $I_P$ represent N-dimensional unit matrix and P-dimensional unit matrix respectively, the N is a total quantity of analog transmission channels corresponding to one digital transmission channel, and P represents a total quantity of digital transmission channels;

transmitting N times consecutively, by the base station, a respective one of calibration signals in the preset first calibration signal matrix S through analog transmission channels corresponding to each of the digital transmission channels, a respective one of calibration weight vectors in the preset calibration weight vector matrix W being used in each of the N times of the transmitting;

constructing, by the base station, a first received data vector matrix $Y_{TX}$ based on all received signals obtained, and calculating a transmission channel error matrix $E_{TX}$ according to the calibration weight vector matrix W, the first calibration signal matrix S and the first received data vector matrix $Y_{TX}$;

performing, by the base station, an error compensation on a respective one analog transmission channel according to each element contained in the transmission channel error matrix $E_{TX}$.

Optionally, determining, by the base station, the preset calibration weight vector matrix W, includes: setting according to a preset beam scanning range, by the base station, N calibration weight vectors: $w_1, w_2, \ldots, w_N$, wherein the N calibration weight vectors satisfy $w_m^H w_n = 0$ and $\|w_m\|^2 = \|w_n\|^2 = N$, $1 \leq m, n \leq N$, $m \neq n$, wherein "$[\cdot]^H$" represents a conjugate transposition operation, and "$\|\cdot\|^2$" represents a 2-norm operation; and constructing, by the base station, the preset calibration weight vector matrix W according to the N calibration weight vectors, wherein the preset calibration weight vector matrix W satisfies $W^H W = N I_N$.

Optionally, determining, by the base station, the preset first calibration signal matrix S, includes: constructing by using a Zadoff-Chu, ZC, sequence, by the base station, P calibration signals: $s_1(t), s_2(t), \ldots, s_P(t)$; wherein the P calibration signals satisfy $E\{s_p(t)s_p^*(t)\} = \sigma_0^2$, $E\{s_m(t)s_n^*(t)\} = 0$, $1 \leq p \leq P$, $1 \leq m, n \leq N$, $m \neq n$, wherein $E\{\ \}$ represents a mathematical expectation operation, $\sigma_0^2$ represents a preset power value, and "*" represents a conjugate operation; and constructing, by the base station, the preset first calibration signal matrix S according to the P calibration signals, wherein the preset first calibration signal matrix S satisfies $S^H S = N I_P$.

Optionally, transmitting N times consecutively, by the base station, a respective one of calibration signals in the preset first calibration signal matrix S through analog transmission channels corresponding to each of the digital transmission channels, a respective one of calibration weight vectors in the preset calibration weight vector matrix W being used in each of the N times of the transmitting, includes: using, by the base station, each of the calibration weight vectors contained in the preset calibration weight vector matrix W respectively to perform following operations: reading, by the base station, one of the calibration weight vectors; and transmitting by using the currently read one of the calibration weight vectors, by the base station, a respective one of the calibration signals in the preset first calibration signal matrix S through analog transmission channels corresponding to each digital transmission channel, wherein analog transmission channels corresponding to one digital transmission channel are used to transmit one kind of calibration signals in the preset first calibration signal matrix S.

Optionally, constructing, by the base station, the first received data vector matrix $Y_{TX}$ based on all received signals obtained, includes: obtaining, by the base station, a received data vector based on a formula of $y_n = x_n^T S^H$ each time the base station obtains a received signal, wherein $X_n$ represents the received signal, $y_n$ represents the received data vector, $1 \leq n \leq N$, $x_n^T$ represents a matrix transposition operation of the received signal $x_n$, and $S^H$ represents a conjugate transposition operation of the preset first calibration signal matrix S; and constructing, by the base station, the first received data vector matrix $Y_{TX}$ based on all received data vectors obtained.

Optionally, the method further includes: transmitting N times consecutively, by the base station, a respective one of the calibration signals in the preset first calibration signal matrix S through analog transmission channels corresponding to each of the digital transmission channels; receiving, by the base station, corresponding target received signals $x_0$; performing, by the base station, time-frequency conversion on the preset first calibration signal matrix S and the target received signals $x_0$ to obtain a calibration signal frequency domain sequence $S_p$ and a received signal frequency domain sequence set $X_0^p$; calculating, by the base station, a transmission channel frequency domain calibration supplementary error vector $H_p$ (p=1, 2, ..., P) based on the obtained calibration signal frequency domain sequence $S_p$ and the received signal frequency domain sequence set $X_0^p$; and performing, by the base station, an error compensation on a respective one of the digital transmission channels according to each channel error value contained in the transmission channel frequency domain calibration supplementary error vector $H_p$ (p=1, 2, ..., P).

A hybrid beam forming architecture-based calibration compensation method includes: determining, by a base station, a preset calibration weight vector matrix W and a preset calibration signal $s_0$, wherein $W^H W = N I_N$, and the N is a total quantity of analog reception channels corresponding to one digital reception channel; receiving, by the base station, the calibration signal $s_0$ through the analog reception channels N times consecutively, one of calibration weight vectors in the preset calibration weight vector matrix W being used during each of the N times of the receiving; constructing, by the base station, a second received data vector matrix $Y_{RX}$ based on all received signals obtained, and calculating a reception channel error matrix $E_{RX}$ according to the calibration signal $s_0$ and the second received data vector matrix $Y_{RX}$; and performing, by the base station, an error compensation on a respective one of analog reception channels according to each element contained in the reception channel error matrix $E_{RX}$.

Optionally, determining, by the base station, the preset calibration weight vector matrix W, includes: setting according to a preset beam scanning range, by the base station, N calibration weight vectors: $w_1, w_2, \ldots, w_N$, wherein the N calibration weight vectors satisfy $w_m^H w_n = 0$ and $\|w_m\|^2 = \|w_n\|^2 = N$, $1 \leq m, n \leq N$, $m \neq n$, wherein "$[\cdot]^H$" represents a conjugate transposition operation, and "$\|\cdot\|^2$" represents a 2-norm operation; and constructing, by the base station, the preset calibration weight vector matrix W according to the N calibration weight vectors, wherein the calibration weight vector matrix W satisfies $W^H W = N I_N$.

Optionally, determining, by the base station, the calibration signal $s_0$, includes: constructing by using a ZC sequence, by the base station, the calibration signal $s_0$.

Optionally, receiving, by the base station, the calibration signal $s_0$ through the analog reception channels N times consecutively, one of calibration weight vectors in the preset calibration weight vector matrix W being used during each of the N times of the receiving, includes: using, by the base station, each of the calibration weight vectors contained in the preset calibration weight vector matrix W respectively to perform following operations: reading, by the base station, one of the calibration weight vectors, and receiving by using the currently read one of the calibration weight vectors, by the base station, the calibration signal $s_0$ through analog reception channels corresponding to each digital reception channel.

Optionally, constructing, by the base station, the second received data vector matrix $Y_{RX}$ based on all received signals obtained, includes: obtaining, by the base station, a received data vector based on a formula of $y_n = X_n s_0^H$ after obtaining the received signals, wherein $X_n$ represents a matrix of the received signals, $y_n$ represents the received data vector, $1 \leq n \leq N$, and $s_0^H$ represents a conjugate transposition operation of the calibration signal $s_0$; and constructing, by the base station, the second received data vector matrix $Y_{RX}$ based on all received data vectors obtained.

Optionally, the method further includes: receiving, by the base station, the calibration signal $s_0$ through analog reception channels corresponding to each digital reception channel N times consecutively; receiving, by the base station, corresponding second target received signals $x_0^{(p)}$; performing, by the base station, time-frequency conversion on the calibration signal $s_0$ (and the second target received signals $x_0^{(p)}$ to obtain a calibration signal frequency domain sequence $s_0$ and a received signal frequency domain sequence set $X_0^p$; calculating, by the base station, a reception channel frequency domain calibration supplementary error vector $H_p$ (p=1, 2, ..., P) based on the obtained calibration signal frequency domain sequence $S_0$ and the received signal frequency domain sequence set $X_0^p$; and performing, by the base station, an error compensation respectively on a respective one of the digital reception channels according to each of channel error values contained in the reception channel frequency domain calibration supplementary error vector $H_p$ (p=1, 2, ..., P).

A hybrid beam forming architecture-based calibration compensation apparatus includes:

a determining unit configured to determine a preset calibration weight vector matrix W and a preset first calibration signal matrix S, wherein $W^H W = N I_N$, $S^H S = N I_P$, $I_N$ and $I_P$ represent N-dimensional unit matrix and P-dimensional unit matrix respectively, the N is a total quantity of analog transmission channels corresponding to one digital transmission channel, and P represents a total quantity of digital transmission channels;

a transmitting unit configured to transmit, N times consecutively, a respective one of calibration signals in the preset first calibration signal matrix S through analog transmission channels corresponding to each of the digital transmission channels, a respective one of calibration weight vectors in the preset calibration weight vector matrix W being used in each of the N times of the transmitting;

a calculation unit configured to construct a first received data vector matrix $Y_{TX}$ based on all received signals obtained, and calculate a transmission channel error matrix $E_{TX}$ according to the calibration weight vector matrix W, the first calibration signal matrix S and the first received data vector matrix $Y_{TX}$;

a processing unit configured to perform an error compensation on a respective one analog transmission channel according to each element contained in the transmission channel error matrix $E_{TX}$.

Optionally, when determining the calibration weight vector matrix W, the determining unit is configured to: set, according to a preset beam scanning range, N calibration weight vectors: $w_1, w_2, \ldots, w_N$, wherein the N calibration weight vectors satisfy $w_m^H w_n = 0$ and $\|w_m\|^2 = \|w_n\|^2 = N$, $1 \le m, n \le N$, $m \ne n$, wherein "$[\cdot]^H$" represents a conjugate transposition operation, and "$\|\cdot\|^2$" represents a 2-norm operation; and construct the preset calibration weight vector matrix W according to the N calibration weight vectors, wherein the preset calibration weight vector matrix W satisfies $W^H W = N I_N$.

Optionally, when determining the preset first calibration signal matrix S, the determining unit is configured to: construct, by using a ZC sequence, P calibration signals: $s_1(t), s_2(t), \ldots, s_P(t)$, wherein the P calibration signals satisfy $E\{s_p(t)s_p^*(t)\} = \sigma_0^2$, $E\{s_m(t)s_n^*(t)\} = 0$, $1 \le p \le P$, $1 \le m, n \le N$, $m \ne n$, wherein $E\{\ \}$ represents a mathematical expectation operation, $\sigma_0^2$ represents a preset power value, and "*" represents a conjugate operation; and construct the preset first calibration signal matrix S according to the P calibration signals, wherein the preset first calibration signal matrix S satisfies $S^H S = N I_P$.

Optionally, when transmitting, N times consecutively, a respective one of calibration signals in the preset first calibration signal matrix S through analog transmission channels corresponding to each of the digital transmission channels, a respective one of calibration weight vectors in the preset calibration weight vector matrix W being used in each of the N times of the transmitting, the transmitting unit is configured to: use each of the calibration weight vectors contained in the preset calibration weight vector matrix W respectively to perform following operations: read one of the calibration weight vectors, and transmit, by using the currently read one of the calibration weight vectors, a respective of the calibration signals in the preset first calibration signal matrix S through analog transmission channels corresponding to each digital transmission channel, wherein analog transmission channels corresponding to one digital transmission channel are used to transmit one kind of calibration signals in the preset first calibration signal matrix S.

Optionally, when constructing the first received data vector matrix $Y_{TX}$ based on all received signals obtained, the calculation unit is configured to: obtain a received data vector based on a formula of $y_n = x_n^T S^H$ each time a received signal is obtained, wherein $x_n$ represents the received signal, $y_n$ represents the received data vector, $1 \le n \le N$, $x_n^T$ represents a matrix transposition operation of the received signal $x_n$, and $S^H$ represents a conjugate transposition operation of the preset first calibration signal matrix S; and construct the first received data vector matrix $Y_{TX}$ based on all received data vectors obtained.

Optionally, the processing unit is further configured to: transmit, N times consecutively, a respective one of the calibration signals in the preset first calibration signal matrix S through analog transmission channels corresponding to each of the digital transmission channels; receive corresponding target received signals $x_0$; perform time-frequency conversion on the preset first calibration signal matrix S and the target received signals $x_0$ to obtain a calibration signal frequency domain sequence $S_p$ and a received signal frequency domain sequence set $X_0^p$; calculate a transmission channel frequency domain calibration supplementary error vector $H_p$ ($p = 1, 2, \ldots, P$) based on the obtained calibration signal frequency domain sequence $S_p$ and the received signal frequency domain sequence set $X_0^p$; and perform an error compensation on a respective one of the digital transmission channels according to each channel error value contained in the transmission channel frequency domain calibration supplementary error vector $H_p$ ($p = 1, 2, \ldots, P$).

A hybrid beam forming architecture-based calibration compensation apparatus includes: a determining unit configured to determine a preset calibration weight vector matrix W and a preset calibration signal $s_0$, wherein $W^H W = N I_N$, and the N is a total quantity of analog reception channels corresponding to one digital reception channel; a receiving unit configured to receive the calibration signal $s_0$ through the analog reception channels N times consecutively, one of calibration weight vectors in the calibration weight vector matrix W being used during each of the N times of the receiving; a calculation unit configured to construct a second received data vector matrix $Y_{RX}$ based on all received signals obtained, and calculate a reception channel error matrix $E_{RX}$ according to the calibration signal $s_0$ and the second received data vector matrix $Y_{RX}$; and a processing unit configured to perform an error compensation on a respective one of analog reception channels according to each element contained in the reception channel error matrix $E_{RX}$.

Optionally, when determining the preset calibration weight vector matrix W, the determining unit is configured to: set, according to a preset beam scanning range, N calibration weight vectors: $w_1, w_2, \ldots, w_N$, wherein the N calibration weight vectors satisfy $w_m^H w_n = 0$ and $\|w_m\|^2 = \|w_n\|^2 = N$, $1 \le m, n \le N$, $m \ne n$, wherein "$[\cdot]^H$" represents a conjugate transposition operation, and "$\|\cdot\|^2$" represents a 2-norm operation; and construct the preset calibration weight vector matrix W according to the N calibration weight vectors, wherein the calibration weight vector matrix W satisfies $W^H W = N I_N$.

Optionally, when determining the preset calibration signal $s_0$, the determining unit is configured to use a ZC sequence to construct the calibration signal $s_0$.

Optionally, when receiving the calibration signal $s_0$ through the analog reception channels N times consecutively, one of calibration weight vectors in the calibration weight vector matrix W being used during each of the N times of the receiving, the receiving unit is configured to: use each of the calibration weight vectors contained in the calibration weight vector matrix W respectively to perform following operations: read one of the calibration weight vectors, and receive, by using the currently read one of the calibration weight vectors, the calibration signal $s_0$ through analog reception channels corresponding to each digital reception channel.

Optionally, when constructing the second received data vector matrix $Y_{RX}$ based on all received signals obtained, the calculation unit is configured to: obtain a received data vector based on a formula of $y_n = X_n s_0^H$ after obtaining the received signals, wherein $X_n$ represents a received signal matrix, $y_n$ represents the received data vector, $1 \le n \le N$, and $s_0^H$ represents a conjugate transposition operation of the calibration signal $s_0$; and construct the second received data vector matrix $Y_{RX}$ based on all received data vectors obtained.

Optionally, the processing unit is further configured to: receive the calibration signal $s_0$ through analog reception channels corresponding to each digital reception channel N times consecutively; receive corresponding second target received signals $x_0^{(p)}$; perform time-frequency conversion on the calibration signal $s_0$ and the second target received signals $x_0^{(p)}$ to obtain a calibration signal frequency domain sequence so and a received signal frequency domain sequence set $X_0^p$; calculate a reception channel frequency domain calibration supplementary error vector vector $H_p$ (p=1, 2, . . . , P) based on the obtained calibration signal frequency domain sequence $S_0$ and the received signal frequency domain sequence set $X_0^p$; and perform an error compensation respectively on a respective one of digital reception channels according to each of channel error values contained in the reception channel frequency domain calibration supplementary error vector $H_p$ (p=1, 2, . . . , P).

A base station includes a processor and a memory, wherein the processor is configured to read a program stored in the memory and perform operations of: determining a preset calibration weight vector matrix W and a preset first calibration signal matrix S, wherein $W^HW=NI_N$, $S^HS=NI_P$, $I_N$ and $I_P$ represent N-dimensional unit matrix and P-dimensional unit matrix respectively, the N is a total quantity of analog transmission channels corresponding to one digital transmission channel, and P represents a total quantity of digital transmission channels; transmitting, N times consecutively, a respective one of calibration signals in the preset first calibration signal matrix S through analog transmission channels corresponding to each of the digital transmission channels, wherein a respective one of calibration weight vectors in the preset calibration weight vector matrix W being used in each of the N times of the transmitting; constructing a first received data vector matrix $Y_{TX}$ based on all received signals obtained, and calculating a transmission channel error matrix $E_{TX}$ according to the calibration weight vector matrix W, the first calibration signal matrix S and the first received data vector matrix $Y_{TX}$; and performing an error compensation on a respective one analog transmission channel according to each element contained in the transmission channel error matrix $E_{TX}$.

A storage medium stores a program for implementing a hybrid beam forming architecture-based calibration compensation method, and the program, when run by a processor, performs steps of: determining a preset calibration weight vector matrix W and a preset first calibration signal matrix S, wherein $W^HW=NI_N$, $S^HS=NI_P$, $I_N$ and $I_P$ represent N-dimensional unit matrix and P-dimensional unit matrix respectively, the N is a total quantity of analog transmission channels corresponding to one digital transmission channel, and P represents a total quantity of digital transmission channels; transmitting, N times consecutively, a respective one of calibration signals in the preset first calibration signal matrix S through analog transmission channels corresponding to each of the digital transmission channels, wherein a respective one of calibration weight vectors in the preset calibration weight vector matrix W being used in each of the N times of the transmitting; constructing a first received data vector matrix $Y_{TX}$ based on all received signals obtained, and calculating a transmission channel error matrix $E_{TX}$ according to the calibration weight vector matrix W, the first calibration signal matrix S and the first received data vector matrix $Y_{TX}$; and performing an error compensation on a respective one analog transmission channel according to each element contained in the transmission channel error matrix $E_{TX}$.

A base station includes a processor and a memory, wherein the processor is configured to read a program stored in the memory and perform operations of: determining a preset calibration weight vector matrix W and a preset calibration signal $s_0$, wherein $W^HW=NI_N$, and the N is a total quantity of analog reception channels corresponding to one digital reception channel; receiving the calibration signal $s_0$ through the analog reception channels N times consecutively, one of calibration weight vectors in the preset calibration weight vector matrix W being used during each of the N times of the receiving; constructing a second received data vector matrix $Y_{RX}$ based on all received signals obtained, and calculating a reception channel error matrix $E_{RX}$ according to the calibration signal $s_0$ and the second received data vector matrix $Y_{RX}$; and performing an error compensation on a respective one of analog reception channels according to each element contained in the reception channel error matrix $E_{RX}$.

A storage medium stores a program for implementing a hybrid beam forming architecture-based calibration compensation method, and the program, when run by a processor, performs steps of: determining a preset calibration weight vector matrix W and a preset calibration signal $s_0$, wherein $W^HW=NI_N$, and the N is a total quantity of analog reception channels corresponding to one digital reception channel; receiving the calibration signal $s_0$ through the analog reception channels N times consecutively, one of calibration weight vectors in the preset calibration weight vector matrix W being used during each of the N times of the receiving; constructing a second received data vector matrix $Y_{RX}$ based on all received signals obtained, and calculating a reception channel error matrix $E_{RX}$ according to the calibration signal $s_0$ and the second received data vector matrix $Y_{RX}$; and performing an error compensation on a respective one of analog reception channels according to each element contained in the reception channel error matrix $E_{RX}$.

In summary, in embodiments of the present application, the base station determines a preset calibration weight vector matrix W and a preset first calibration signal matrix S, then transmits the calibration signals through analog transmission channels N times consecutively, calculates the transmission channel error matrix $E_{TX}$ according to the calibration weight vector matrix W, the first calibration signal matrix S and the first received data vector matrix $Y_{TX}$, and then performs the error compensation on the corresponding analog transmission channel according to $E_{TX}$. In this way, the high-dimensional matrix inversion operation can be avoided, the system operation efficiency can be improved, and the switching times of analog transmission channels can be reduced, the calculation resources and calculation complexity can be reduced, and thus the compensation of each analog transmission channel can be ensured, the accuracy and effectiveness of calibration compensation can be improved, and the precision of error compensation can be increased.

DETAILED DESCRIPTION OF THE EMBODIMENTS

The technical solutions in the embodiments of the present application will be described clearly and completely below in combination with the accompanying drawings in the embodiments of the present application. Obviously the described embodiments are only a part of embodiments of the present application but not all embodiments. Based upon the described embodiments of the present application, all of other embodiments obtained by those ordinary skilled in the art without creative work pertain to the protection scope of the present application.

Figure 1:
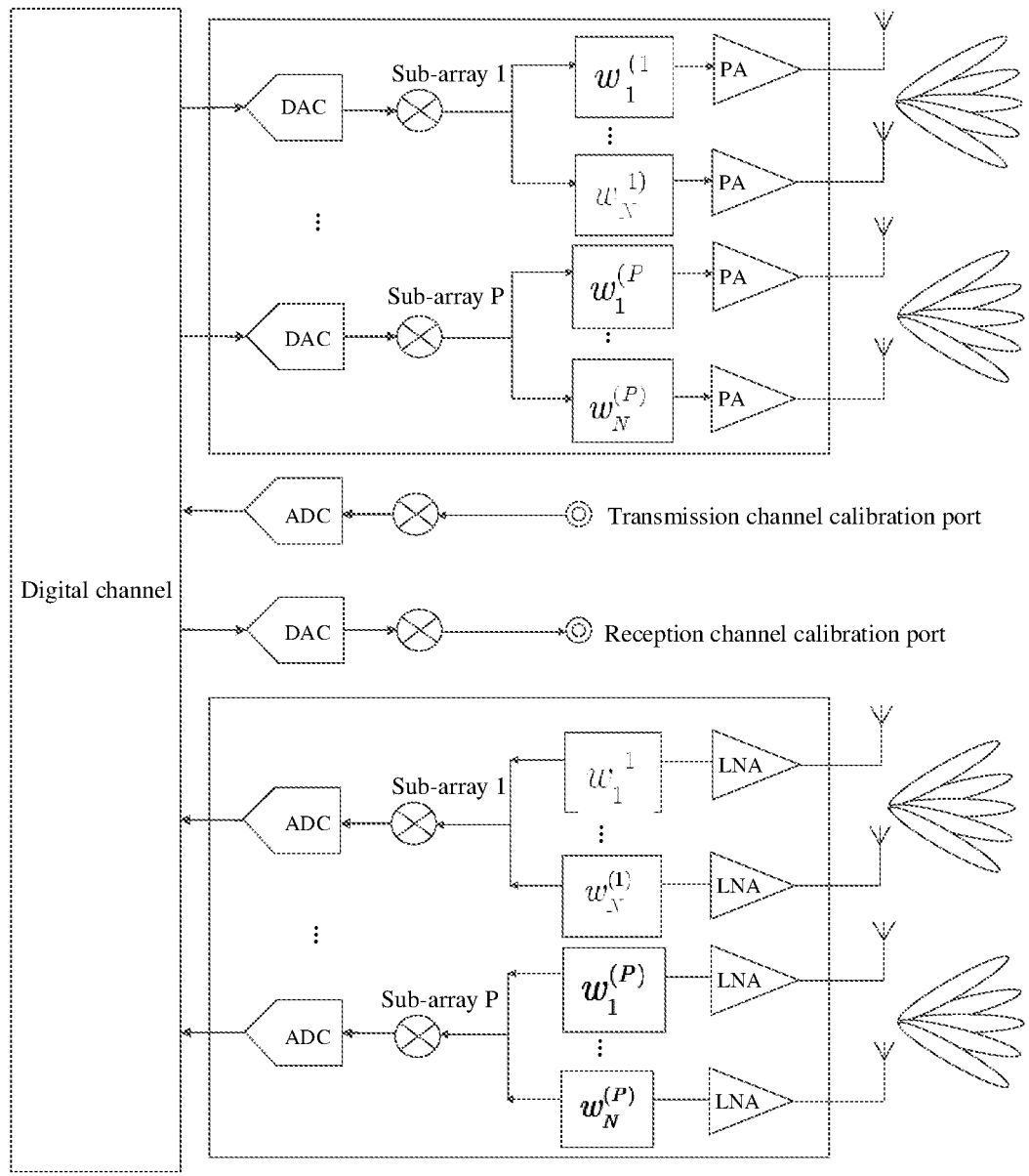
FIG. 1 is a schematic diagram of a hybrid beamforming architecture in an embodiment of the present application.

In some embodiments of the present application, as shown in FIG. 1, in the hybrid beamforming architecture, for convenience of description, the analog channels corresponding to one same digital channel is called a sub-array. The quantity of digital channels in the antenna array shown in FIG. 1 is P, that is, it contains P sub-arrays. Each sub-array contains N analog channels. The base station sends out a digital signal through a digital channel. The digital signal is converted into an analog signal through a Digital to Analog Converter (DAC). The analog signal is forwarded through analog channels (one digital channel corresponds to N analog channels). The analog signal is sent out through Power Amplifiers (PA). A transmission channel calibration port, after receiving the sent analog signal, performs the calibration compensation on each analog channel. The analog signal is converted into a digital signal through an Analog to Digital Converter (ADC). The digital signal is forwarded through digital channels. The calibration compensation is performed on each digital channel. Furthermore, a reception channel calibration port of the base station, after receiving an analog signal, can perform the calibration compensation on each analog channel. The analog signal is sent out through Low Noise Amplifiers (LNA). The analog signal transmitted in the analog channels is converted into a digital signal through the ADCs. The digital signal is forwarded through digital channels. The calibration compensation is performed on each digital channel.

For large-scale antenna arrays, the amplitude and phase differences among multiple channels are mainly composed of two parts: one is the initial phase difference corresponding to the center frequency caused by the channel difference; and the other is the phase difference that changes with phase caused by the frequency bandwidth, which needs to be compensated through the bandwidth calibration model. In embodiments of the present application, for the initial phase difference corresponding to the center frequency, the calibration compensation can be performed on the analog channels through the error matrix; and for the phase difference of the working bandwidth range, the calibration compensation can be performed on the digital channels through amplitude and phase balance after the calibration compensation is performed on the analog channels.

In some embodiments of the present application, as shown in FIG. 1, it is assumed in the transmission channel area that the analog transmission channel 1 of the sub-array 1 is the reference channel, $e_{pn}$ represents the amplitude and phase error of the $n^{th}$ analog transmission channel of the $p^{th}$ sub-array relative to the reference channel, $e_p=[e_{p1}, e_{p2}, \ldots, e_{pN}]^T$ represents the channel error vector of the $p^{th}$ sub-array, and "$[\cdot]^T$" represents the matrix transposition operation. The array error matrix formed by the amplitude and phase errors of analog transmission channels under the hybrid beamforming architecture can be expressed as $E=[e_1, e_2, \ldots, e_p]$. Under the hybrid beamforming architecture, the calibration compensation for the initial amplitude and phase error of each analog transmission channel is mainly to obtain the transmission channel error matrix $E_{TX}$ through a specific apparatus and method.

Figure 2:
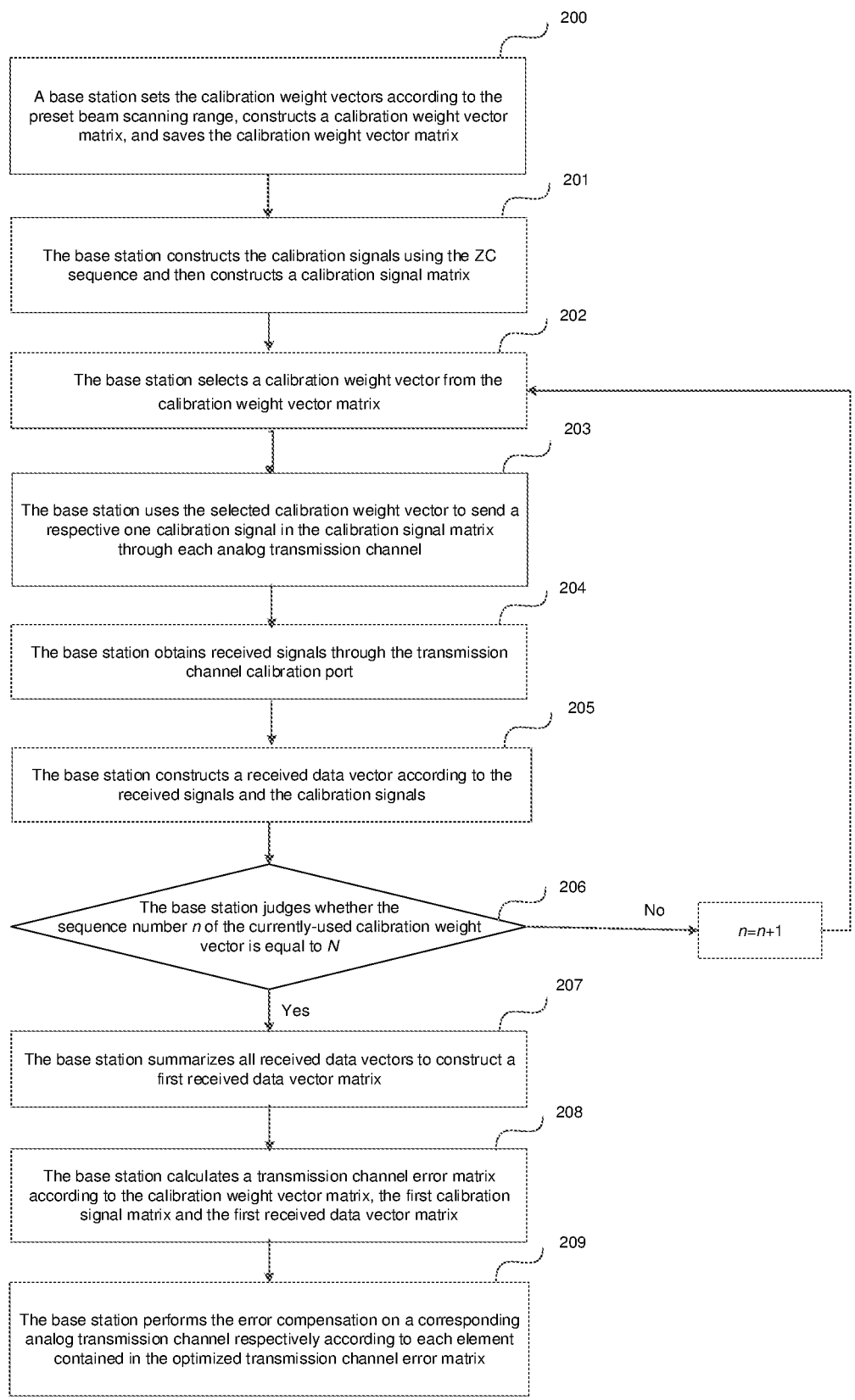
FIG. 2 is a schematic diagram of a calibration compensation process of an analog transmission channel in an embodiment of the present application.

As shown in FIG. 2, the detailed process in which a base station performs the calibration compensation on analog transmission channels is as follows.

Step 200: a base station sets N calibration weight vectors according to a preset beam scanning range, constructs a calibration weight vector matrix W, and saves the calibration weight vector matrix W. N is the total quantity of analog transmission channels included in one sub-array corresponding to one digital transmission channel.

In embodiments of the present application, the base station constructs N calibration weight vectors $w_1, w_2, \ldots, w_N$ that are not related to each other by traversing the preset beam scanning range. $1 \le m, n \le N$. For any $m \ne n$, the calibration weight vector satisfies $w_m^H w_n = 0$ and $\|w_m\|^2 = \|w_n\|^2 = N$. "$[\cdot]^H$" represents the conjugate transposition operation, "$\|\cdot\|^2$" represents the 2-norm operation. The calibration weight vector matrix is $W=[w_1, w_2, \ldots, w_N]$. Since W during creation meets the two above conditions, W satisfies $W^H W = NI_N$. Since the calibration weight vector matrix W is a full rank matrix, $W W^H = NI_N$, $I_N$ represents the N-dimensional unit matrix. The base station can store the calibration weight vector matrix W, which is convenient to call and switch. The specific storage method can be selected flexibly according to the overall consideration of the system hardware architecture and performance. The general method is to find the calibration weight vectors corresponding to N beam directions so that they satisfy the properties of the aforementioned calibration weight vector matrix and have the property that the amplitude of each element is unchanged and only the phases are different. For the convenience of description, the amplitude of each element in W can be limited to 1, that is, $|W(m, n)|=1$, where $1 \le m, n \le N$.

Step 201: the base station constructs P calibration signals using the ZC (Zadoff-Chu) sequence and then constructs a first calibration signal matrix S, P is the total quantity of digital transmission channels.

In embodiments of the present application, after constructing the calibration weight vector matrix W, the base station constructs P calibration signals $s_1(t), s_2(t), \ldots s_P(t)$ with equal power and uncorrelated with each other. The calibration signals satisfy $E\{s_p(t)s_p(t)\}=\sigma_0^2$, $E\{s_m(t)s_n^*(t)\}=0$, $1 \le p \le P$, $1 \le m,n \le N$, $m \ne n$, and "*" represents the conjugate operation. In practical applications, the data processed on the digital transmission channel is discrete data, so $s_p=[s_{p1}, s_{p2}, \ldots, s_{pK}]$ is used to replace $s_p(t)$ below, and K represents the length of the calibration sequence. The first calibration signal matrix is $S=[s_1, s_2, \ldots, s_P]^T$. Since S during creation satisfies $E\{s_p(t)s_p^*(t)\}=\sigma_0^2$ and $E\{s_m(t)s_n^*(t)\}=0$ s satisfies $S^H S=\sigma_0^2 I_P$; and since the first calibration signal matrix S is a full rank matrix, $SS^H=\sigma_0^2 I_P$. The calibration signal $s_p$ can be constructed using signals with special property such as ZC sequence, which is convenient for mapping to each transmission channel in the frequency domain, so as to perform the amplitude-phase equalization and calibration on the digital transmission channels.

Step 202: the base station selects a calibration weight vector $w_n$ from the calibration weight vector matrix W, where $1 \leq n \leq N$.

During the initial selection, the base station may set the initial value of n as 1.

Step 203: the base station uses the selected calibration weight vector $w^n$ to send the corresponding calibration signal respectively through each analog transmission channel based on the first calibration signal matrix S.

In embodiments of the present application, after constructing the calibration weight vector matrix W and the first calibration signal matrix S, the base station may receive, through the transmission channel calibration port, the calibration signals (such as $s_1, s_2, \ldots, s_P$) sent by the base station through the digital transmission channels and the analog transmission channels. The base station sends a calibration signal through analog transmission channel(s) included in a sub-array in the sending process, and different sub-arrays use the same calibration weight vector $w_n$.

For example, when n=1, the calibration weight vector is $w_1$, the calibration weight vector $w_1$ is used for sending the calibration signal $s_1$ on the sub-array 1, the calibration weight vector $w_1$ is used for sending the calibration signal $s_2$ on the sub-array 2, . . . , and the calibration weight vector $w_1$ is used for sending the calibration signal $s_P$ on the sub-array P When n=2, the calibration weight vector is $w_2$, the calibration weight vector $w_2$ is used for sending the calibration signal $s_1$ on the sub-array 1, the calibration weight vector $w_2$ is used for sending the calibration signal $s_2$ on the sub-array 2, . . . , and the calibration weight vector $w_2$ is used for sending the calibration signal $s_P$ on the sub-array P. When n=N, the calibration weight vector is $w_N$, the calibration weight vector $w_N$ is used for sending the calibration signal $s_1$ on the sub-array 1, the calibration weight vector $w_N$ is used for sending the calibration signal $s_2$ on the sub-array 2, . . . , and the calibration weight vector $w_N$ is used for sending the calibration signal $s_P$ on the sub-array P.

As can be seen from the above process, the base station needs to switch the calibration weight vector N times to complete the calibration signal transmission, that is, only one calibration weight vector is used at a time, the calibration signals $s_1, s_2, \ldots, s_P$ are sent respectively on the analog transmission channels included in each sub-array, and the calibration signals $s_1, s_2, \ldots, s_P$ need to be sent N times in total.

Step 204: the base station obtains received signals $x_n$ through the transmission channel calibration port.

In embodiments of the present application, after sending the calibration signals $s_1, s_2, \ldots, s_P$ once by using the calibration weight vector $w_n$, the base station can obtain the received signal $x_n$ through the transmission channel calibration port, $x_n=[x_n(1), x_n(2), \ldots, x_n(K)]^T$.

Step 205: the base station constructs a received data vector $y_n$ based on the obtained received signals $x_n$ and the first calibration signal matrix S.

The base station may obtain a corresponding received data vector based on a formula of $y_n=x_n^T S^H$ each time it obtains a received signal, $x_n$ represents the received signal, $y_n$ represents the received data vector, $1 \leq n \leq N$, $x_n^T$ represents the matrix transposition operation of the received signal $x_n$, and $S^H$ represents the conjugate transposition operation of the first calibration signal matrix S.

Step 206: the base station judges whether the sequence number n of the currently-used calibration weight vector $w_n$ is equal to N; if so, executes step 207; otherwise, executes n=n+1 and returns to step 202.

In embodiments of the present application, after obtaining the received data vector $y_n$, the base station judges whether the sequence number n of the calibration weight vector $w_n$ is equal to N, N is the total quantity of analog transmission channels included in one sub-array corresponding to one digital transmission channel. If the sequence number of the calibration weight vector $w_n$ is n=N, step 207 is performed; otherwise, n=n+1 is performed and it returns to step 202, where the base station re-selects the next new calibration weight vector $w_n$ from the calibration weight vector matrix W, and then sends the calibration signal through each analog transmission channel again and obtains the new received signal $x_n$.

Step 207: the base station summarizes all received data vectors $y_n$ to construct a first received data vector matrix $Y_{TX}$.

In embodiments of the present application, the base station constructs the received data vector $y_n$ as $y_n=x_n^T S^H$, where $1 \leq n \leq N$. Since n has N values, the base station can obtain N groups of received data vectors $y_n$ (p), and the received data vector is $y_n=[y_n(1), y_n(2), \ldots, y_n(P)]^T$. Therefore, the received data vector matrix $Y_{TX}$ can be expressed as $Y_{TX}=[y_1, y_2, \ldots, y_N]^T$.

Step 208: the base station calculates a transmission channel error matrix $E_{TX}$ according to the calibration weight vector matrix W, the first calibration signal matrix S and the first received data vector matrix $Y_{TX}$.

In embodiments of the present application, when sending the calibration signals $s_1, s_2, \ldots, s_P$ on the analog transmission channels included in each sub-array, the base station needs to send the calibration signals $s_1, s_2, \ldots s_P$ N times in total, so the base station can receive N groups of signals $x_n(k)$ (n=1, 2, . . . , N and k=1, 2, . . . K) through the transmission channel calibration port when judging that the sequence number of the calibration weight vector $w_n$ is n=N K represents the length of the calibration sequence. The received signal is $x_n=[x_n(1), x_n(2), \ldots x_n(K)]^T$, so the first received signal matrix $X_{TX}$ obtained by the base station can be expressed as $X_{TX}=[x_1, x_2, \ldots, x_N]^T$.

In theory, the relationship among the calibration weight vector matrix W, the transmission channel error matrix $E_{TX}$, the first calibration signal matrix S and the first received signal matrix $X_{TX}$ can be expressed as: $W^H E_{TX} S = X_{TX}$.

Both sides of $W^H E_{TX} S = X_{TX}$ are multiplied by $S^H$ and $(W^H)^{-1}$ at the same time, and "$(\cdot)^{-1}$" represents the matrix inversion operation. $\sigma_0^2 E_{TX} = (W^H)^{-1} X_{TX} S^H$ can be obtained according to $SS^H=\sigma_0^2 I_P$. Then, in theory, the transmission channel error matrix $E_{TX}$ calculated by the base station according to the calibration weight vector matrix W, the first calibration signal matrix S and the first received signal matrix $x_{TX}$ is $$E_{TX} = \frac{1}{\sigma_0^2}(W^H)^{-1} X_{TX} S^H.$$

In embodiments of the present application, the relationship among the calibration weight vector matrix W, the first received data vector matrix $Y_{TX}$, the first received signal matrix $X_{TX}$ and the first calibration signal matrix S can be expressed as $Y_{TX}^T = X_{TX} S^H$, and then the base station substitutes $Y_{TX}^T = X_{TX} S^H$ into $$E_{TX} = \frac{1}{N\sigma_0^2} W X_{TX} S^H$$

to obtain the transmission channel error matrix $$E_{TX} = \frac{1}{\sigma_0^2} (W^H)^{-1} Y_{TX}^T.$$

According to step 200, the calibration weight vector W satisfies $W^H W = N I_N$, that is, $$(W^H)^{-1} = \frac{1}{N} W,$$

and $$(W^H)^{-1} = \frac{1}{N} W$$

is substituted into $$E_{TX} = \frac{1}{\sigma_0^2} (W^H)^{-1} Y_{TX}^T$$

to obtain the transmission channel error matrix $$E_{TX} = \frac{1}{N\sigma_0^2} W Y_{TX}^T.$$

When calculating the transmission channel error matrix $E_{TX}$, $Y_{TX}^T$ is used to replace $X_{TX} S^H$, that is, $y_n$ is used to replace $x_n$. Since the dimension of $y_n$ is 1×P, the dimension of $x_n$ is 1×K, and P<<K in a general case, the storage resources required for calibration and calculation data can be reduced every time the weight vector of the analog transmission channel is switched.

When the transmission channel error matrix $E_{TX}$ is calculated, $$\frac{1}{N} W$$

is used to replace $(W^H)^{-1}$, which can eliminate the need for matrix inversion operation and reduce computing resources greatly in the calculation process.

Step 209: the base station performs the error compensation on a respective one analog transmission channel according to each element contained in the optimized transmission channel error matrix $E_{TX}$.

In embodiments of the present application, the transmission channel error matrix $E_{TX}$ contains P analog transmission channel error vectors, each of which corresponds to a respective one of P sub-arrays, and each analog transmission channel error vector contains N elements. It is assumed that any element $e_{pn}$ in the transmission channel error matrix $E_{TX}$ represents the amplitude and phase error of the $n^{th}$ channel of the $p^{th}$ sub-array of the transmission channel relative to the reference channel, then the analog transmission channel error vector of the $p^{th}$ sub-array is $e_p = [e_{p1}, e_{p2}, \ldots, e_{pN}]^T$, that is, $e_{p1}, e_{p2} \ldots e_{pN}$ corresponds respectively to each of N analog transmission channels contained in the $p^{th}$ sub-array, so each element in the transmission channel error matrix $E_{TX}$ corresponds respectively to one analog transmission channel, so that the base station can use each element contained in the transmission channel error matrix $E_{TX}$ to perform the calibration compensation respectively on the analog transmission channel of the corresponding transmitting signal, thus completing the calibration compensation for the initial amplitude and phase error of the analog transmission channel corresponding to the center frequency. And, the adjustment of the initial amplitude and phase error of the analog transmission channel corresponding to center frequency is actually to adjust the amplitude and phase error between the transmission channels caused by the hardware difference between the analog transmission channels.

So far, each analog transmission channel in the base station has been calibrated. Optionally, each digital transmission channel in the base station can further be calibrated, that is, adjust the amplitude and phase error generated when the same digital transmission channel transmits transmission signals at different frequencies.

Figure 3:
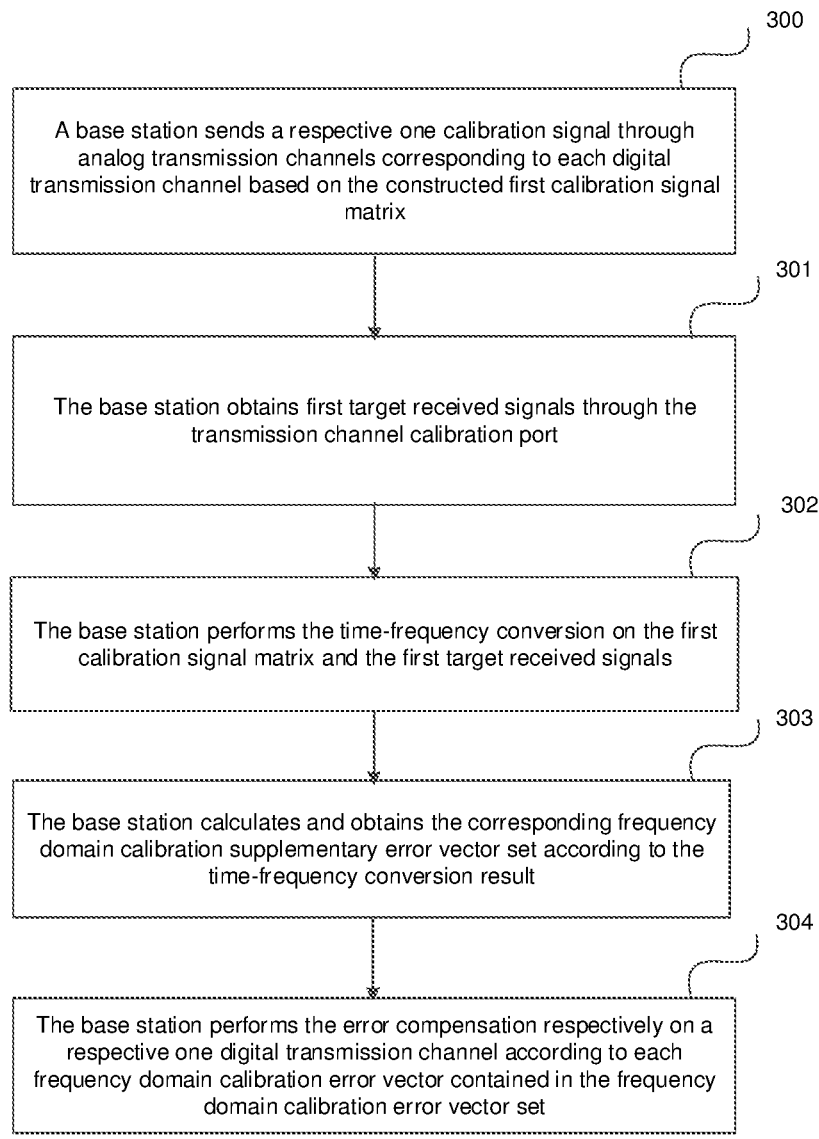
FIG. 3 is a schematic diagram of a calibration compensation process of a digital transmission channel in an embodiment of the present application.

Referring to FIG. 3, in embodiments of the present application, the detailed process of calibration and compensation for the digital transmission channel is as follows.

Step 300: a base station sends the corresponding calibration signal through analog transmission channels corresponding to each digital transmission channel based on the constructed first calibration signal matrix S.

In embodiments of the present application, after using each element contained in the transmission channel error matrix $E_{TX}$ to perform the error compensation on the corresponding analog transmission channel respectively, the base station can complete the calibration compensation for the initial amplitude and phase error of the analog transmission channel corresponding to the center frequency.

The base station may send the calibration signal (such as $s_1, s_2, \ldots, s_P$) through the analog transmission channels corresponding to each digital transmission channel in the 0° beam direction. The base station sends the calibration signal $s_1$ through analog transmission channels corresponding to the digital transmission channel 1, sends the calibration signal $s_2$ through analog transmission channels corresponding to the digital transmission channel 2, ..., and sends the calibration signal $s_P$ through analog transmission channels corresponding to the digital transmission channel P.

Step 301: the base station obtains first target received signals $x_0$ through the transmission channel calibration port.

In embodiments of the present application, after sending the calibration signals $s_1, s_2, \ldots, s_P$ through the analog transmission channels corresponding to each digital transmission channel, the base station may obtain the first target received signals $x_0$ through the transmission channel calibration port.

Step 302: the base station performs the time-frequency conversion on the first calibration signal matrix S and the first target received signals $X_0$.

For example, at first, the base station performs the time-frequency conversion on the first calibration signal matrix S to obtain a calibration signal frequency domain sequence set corresponding to the first calibration signal matrix S. The calibration signal frequency domain sequence corresponding to one calibration signal $s_P$ in the first calibration signal matrix S is: $S_p=F[s_p]$, p=1, 2, ..., P, F[ ] represents the Fourier transform.

Next, the base station performs the Fourier transform on the first target received signals $x_0$ to obtain the corresponding received signal frequency domain sequence set $x_0$. The received frequency domain sequence corresponding to one calibration signal $s_p$ is: $X_0^P$ (p=1, 2, ..., P).

In embodiments of the present application, after obtaining the first target received signals $x_0$, the base station performs the Fourier transform on the first target received signals $X_0$, and then the received signal frequency domain sequence set $x_0$ corresponding to the first target received signals $x_0$ can be expressed as $X_0=F[x_0]$. According to the construction method of the calibration signal, $x_0$ can be mapped to each digital transmission channel, that is, $x_0$ can be mapped to P digital transmission channels to obtain the received signal frequency domain sequence $X_0^P$, (p=1, 2, ..., P) corresponding to each digital transmission channel and the calibration signal frequency domain sequence $S_p$.

Step 303: the base station calculates and obtains the corresponding transmission channel frequency domain calibration supplementary error vector set $H_0$ according to the time-frequency conversion result.

Taking any calibration signal $s_P$ as an example, the base station calculates and obtains the transmission channel frequency domain calibration supplementary error vector $H_p$ corresponding to $s_P$ according to the calibration signal frequency domain sequence $S_p$ and the received signal frequency domain sequence $X_0^P$ corresponding to $S_P$. $H_p = _pØX_0^P$, (p=1, 2, ..., P), "Ø" represents the division operation of corresponding elements at the same position. In the same way, the frequency domain calibration supplementary error vector $H_p$ (p=1, 2, ..., P) of each transmission channel is calculated.

Step 304: the base station performs the error compensation respectively on the corresponding digital transmission channel according to each transmission channel frequency domain calibration error vector contained in the transmission channel frequency domain calibration error vectors $H_p$ (p=1, 2, ..., P).

In embodiments of the present application, the transmission channel frequency domain calibration error vector $H_p$ (p=1, 2, ..., P) contains P error vectors, which correspond to P digital transmission channels respectively. Therefore, after obtaining the transmission channel frequency domain calibration error vector $H_p$ (p=1, 2, ..., P), the base station can compensate the transmission channel frequency domain calibration error vector corresponding to each digital transmission channel to the broadband modulation signal transmitted by each digital transmission channel in the frequency domain, to complete the frequency-domain amplitude and phase calibration compensation of the digital transmission channel of each transmission channel.

So far, each analog transmission channel and each digital transmission channel in the base station have been calibrated. Optionally, the base station may further calibrate each analog reception channel and each digital reception channel.

Based on the foregoing embodiments, further, the base station can also calibrate each analog reception channel and each digital reception channel in the same way.

For example, referring to FIG. 1, in embodiments of the present application, it is assumed in the reception channel area that the analog reception channel 1 of the sub-array 1 is the reference channel, $e_{pn}$ represents the amplitude and phase error of the $n^{th}$ analog reception channel of the $p^{th}$ sub-array relative to the reference channel, $e_p=[e_{p1}, e_{p2}, ..., e_{pN}]^T$ represents the channel error vector of the $p^{th}$ sub-array, "$[·]^T$" represents the matrix transposition operation, so the array error matrix formed by the amplitude and phase errors of analog reception channels under the hybrid beamforming architecture can be expressed as $E=[e_1, e_2, ..., e_P]$. Under the hybrid beamforming architecture, the calibration compensation for the initial amplitude and phase error of each analog reception channel is mainly to obtain the reception channel error matrix $E_{RX}$ through a specific apparatus and method.

Figure 4:
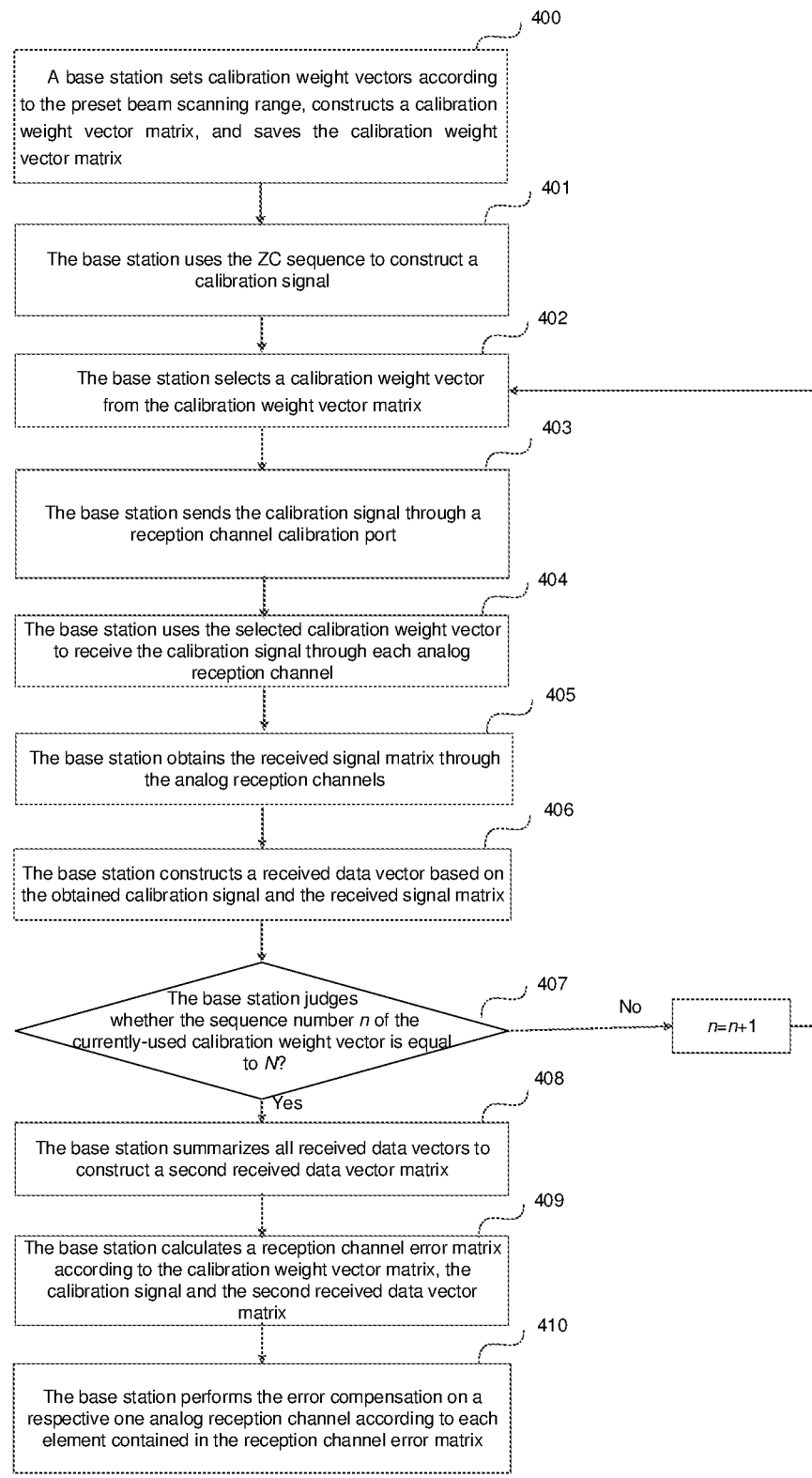
FIG. 4 is a schematic diagram of a calibration compensation process of an analog reception channel in an embodiment of the present application.

As shown in FIG. 4, the detailed process in which a base station performs the calibration compensation on analog reception channels is as follows.

Step 400: a base station sets N calibration weight vectors according to the preset beam scanning range, constructs a calibration weight vector matrix W, and saves the calibration weight vector matrix W. N is the total quantity of analog reception channels included in one sub-array corresponding to one digital reception channel.

In embodiments of the present application, the base station constructs N calibration weight vectors $w_1, w_2, ..., w_N$ that are not related to each other by traversing the preset beam scanning range, where 1≤m, n≤N. For any m≠n, the calibration weight vector satisfies $w_m^H w_n=0$ and $\|w_m\|^2=\|w_n\|^2=N$, "$[·]^H$" represents the conjugate transpose operation, "$\|·\|^2$" represents the 2-norm operation, and the calibration weight vector matrix is $W=[w_1, w_2, ..., w_N]$. Since W meets two above conditions in the creation process, W satisfies $W^H W=NI_N$. Since the calibration weight vector matrix W is a full rank matrix, $WW^H=NI_N$, $I_N$ represents the N-dimensional unit matrix. The base station can store the calibration weight vector matrix W, which is convenient to call and switch. The specific storage method can be selected flexibly according to the overall consideration of the system hardware architecture and performance. The general method is to find the calibration weight vectors corresponding to N beam directions so that they satisfy the properties of the aforementioned calibration weight vector matrix and have the property that the amplitude of each element is unchanged and only the phases are different. For the convenience of description, the amplitude of each element in W can be limited to 1, that is, |W(m, n)|=1, where 1≤m, n≤N.

Step 401: the base station uses the ZC sequence to construct a calibration signal $s_0$.

In embodiments of the present application, after constructing the calibration weight vector matrix W, the base station may use the ZC sequence to construct a calibration signal $s_0$. The calibration signal $s_0$ may also be expressed as a calibration sequence $s_0(k)$, where k=1, 2, ..., K, and K represents the length of the calibration sequence.

Step 402: the base station selects a calibration weight vector $w_n$ from the calibration weight vector matrix W, where 1≤n≤N.

Optionally, during the initial selection, the base station may set the initial value of n as 1.

Step 403: the base station sends the calibration signal $s_0$ through a reception channel calibration port.

In embodiments of the present application, after constructing the calibration weight vector matrix W and a calibration signal $s_0$, the base station can send the calibration signal $s_0$ through the reception channel calibration port, and then the base station can receive the calibration signal $s_0$ through analog reception channels included in each sub-array.

Step 404: the base station uses the selected calibration weight vector $w_n$ to receive the calibration signal $s_0$ through each analog reception channel.

In embodiments of the present application, after the base station sends the calibration signal $s_0$ through the reception channel calibration port, the base station may receive the calibration signal $s_0$ through analog reception channels included in each sub-array, and different sub-arrays use the same calibration weight vector $w_n$.

For example, when n=1, the calibration weight vector is $w_1$, the calibration weight vector $w_1$ is used to receive the calibration signal $s_0$ on the sub-array 1, the calibration weight vector $w_1$ is used to receive the calibration signal $s_0$ on the sub-array 2, . . . , and the calibration weight vector $w_1$ is used to receive the calibration signal $s_0$ on the sub-array P; when n=2, the calibration weight vector is $w_2$, the calibration weight vector $w_2$ is used to receive the calibration signal $s_0$ on the sub-array 1, the calibration weight vector $w_2$ is used to receive the calibration signal $s_0$ on the sub-array 2, . . . , and the calibration weight vector $w_2$ is used to receive the calibration signal $s_0$ on the sub-array P; when n=N, the calibration weight vector is $w_N$, the calibration weight vector $w_N$ is used to receive the calibration signal $s_0$ on the sub-array 1, the calibration weight vector $w_N$ is used to receive the calibration signal $s_0$ on the sub-array 2, . . . , and the calibration weight vector $w_N$ is used to receive the calibration signal $s_0$ on the sub-array P.

As can be seen from the above process, the base station needs to switch the calibration weight vector N times to complete the receiving process of the calibration signal $s_0$, that is, only one calibration weight vector is used at a time, the calibration signal $s_0$ is received respectively on the analog reception channels included in each sub-array, and the calibration signal $s_0$ needs to be received N times in total.

Step 405: the base station obtains the received signal matrix $X_n$ through the analog reception channel.

In embodiments of the present application, the received signals obtained by the base station through the analog reception channels included in a sub-array after receiving the calibration signal $s_0$ can be expressed as: $x_p^{(n)}(k)$ k=1, 2, . . . , K, p=1, 2, . . . , P, K represents the length of the calibration sequence. There are P sub-arrays in the reception channel area, so P groups of received signals in total can be obtained through P sub-arrays, and then a received signal matrix $X_n$ is constructed, which can be expressed as $X_n=[x_1^{(n)}, x_2^{(n)}, \ldots, X_P^{(n)}]^T$, where n=1, 2, . . . , N.

Step 406: the base station constructs a received data vector $y_n$ based on the obtained calibration signal $s_0$ and the received signal matrix $X_n$.

For example, after obtaining the calibration signal $s_0$, the base station can obtain the corresponding received data vector based on the formula of $y_n=X_n s_0^H$, $s_0$ represents the calibration signal, $y_n$ represents the received data vector, and $1 \le n \le N$, $s_0^H$ represents the conjugate transposition operation of the calibration signal $s_0$.

Step 407: the base station judges whether the sequence number n of the currently-used calibration weight vector $w_n$ is equal to N; if so, executes step 408; otherwise, executes n=n+1 and returns to step 402.

In embodiments of the present application, after obtaining the received data vector $y_n$, the base station judges whether the sequence number n of the calibration weight vector $w_n$ is equal to N, N is the total number of analog transmission channels included in one sub-array corresponding to one digital transmission channel. If the sequence number of the calibration weight vector $w_n$ is n=N, step 408 is performed; otherwise, n=n+1 is performed and it returns to step 402, where the base station re-sends the calibration signal $s_0$ through the reception channel calibration port, selects the next new calibration weight vector $w_n$ from the calibration weight vector matrix W, and then uses the selected calibration weight vector $w^n$ to receive the calibration signal $s_0$ through each analog reception channel again.

Step 408: the base station summarizes all received data vectors $y_n$ to construct a second received data vector matrix $Y_{RX}$.

In embodiments of the present application, the base station constructs the received data vector $y_n$ as $y_n=X_n s_0^H$, where $1 \le n \le N$. The received data vector matrix $Y_{RX}$ is $Y_{RX}=[y_1, y_2, \ldots, y_N]$, and the received data vector matrix is further obtained as $Y_{RX}=[X_1 s_0^H, X_2 s_0^H, \ldots, X_N s_0^H]$.

Step 409: the base station calculates a reception channel error matrix $E_{RX}$ according to the calibration weight vector matrix W, the calibration signal $s_0$ and the second received data vector matrix $Y_{RX}$.

In embodiments of the present application, when receiving the calibration signal $s_0$ through the analog reception channels included in each sub-array, the base station needs to receive the calibration signal $s_0$ N times in total, that is, the calibration weight vector needs to be switched N times in total for the analog reception channels of the base station to complete the receiving process of the calibration signal $s_0$. The received signals obtained through analog reception channels contained in each sub-array for the $n^{th}$ time is $x_p^{(n)}(k)$, where n=1, 2, . . . , N, k=1, 2, . . . , K, p=1, 2, . . . , P, K represents the length of the calibration sequence. Therefore, when judging that the sequence number of the calibration weight vector $w_n$ is n, the base station can obtain P groups of received signals $X_p^{(n)}$ (p=1, 2, . . . , P) through analog reception channels included in each sub-array, and then the received signal matrix $X_n$ can be expressed as $X_n=[x_1^{(n)}, x_2^{(n)}, \ldots, x_P^{(n)}]^T$.

In theory, the relationship among the calibration signal $s_0$, the received signal matrix $X_n$ and the reception channel error matrix $E_{RX}$ can be expressed as: $E_{RX}^T w_n s_0 = X_n$, n=1, 2, . . . , N. Both sides of $E_{RX}^T w_n s_0 = X_n$, n=1, 2, . . . , N are multiplied by $s_0^H$ at the same time, so $$E_{RX}^T w_n^* = \frac{1}{\sigma_0^2} X_n s_0^H, n = 1, 2, \ldots, N,$$

where "*" represents the conjugate operation. Further, the received data vector $y_n$ is constructed as $y_n=X_n s_0^H$, where n=1, 2, . . . , N, so the second received data vector matrix $Y_{RX}$ can be expressed as $Y_{RX}=[y_1, y_2, \ldots y_N]$, thereby obtaining $Y_{RX}=[X_1 s_0^H, X_2 s_0^H, \ldots, X_N s_0^H]$. Then, $Y_{RX}=[X_1 s_0^H, X_2 s_0^H, \ldots, X_N s_0^H]$ is substituted into $$E_{RX}^T w_n^* = \frac{1}{\sigma_0^2} X_n s_0^H, n = 1, 2, \ldots, N$$

to obtain $E_{RX}^T W^* = Y_{RX}$, and both sides are multiplied by $W^T$ at the same time, so $NE_{RX}^T = Y_{RX} W^T$, and then the reception channel error matrix $E_{RX}$ can be obtained as $$E_{RX} = \frac{1}{N} W Y_{RX}^T.$$

Step 410: the base station performs the error compensation on the corresponding analog reception channel respectively according to each element contained in the reception channel error matrix $E_{RX}$.

In embodiments of the present application, the reception channel error matrix $E_{RX}$ contains P analog reception channel error vectors, each of which corresponds to each of P sub-arrays, and each analog reception channel error vector contains N elements. It is assumed that any element $e_{pn}$ in the reception channel error matrix $E_{RX}$ represents the amplitude and phase error of the $n^{th}$ channel of the $p^{th}$ sub-array of the reception channel relative to the reference channel, then the analog reception channel error vector of the $p^{th}$ sub-array is $e_p=[e_{p1}, e_{p2}, \ldots, e_{pN}]^T$, that is, $e_{p1}, e_{p2}, \ldots, e_{pN}$ correspond respectively to N analog reception channels contained in the $p^{th}$ sub-array, so each element in the reception channel error matrix $E_{RX}$ corresponds respectively to one analog reception channel, so that the base station can use each element contained in the reception channel error matrix $E_{RX}$ to perform the calibration compensation respectively on the analog reception channel of the corresponding received signal, thus completing the calibration compensation for the initial amplitude and phase error of the analog reception channel corresponding to the center frequency. And, the adjustment of the initial amplitude and phase error of the analog reception channel corresponding to center frequency is actually to adjust the amplitude and phase error between the reception channels caused by the hardware difference between the analog reception channels.

So far, each analog reception channel in the base station has been calibrated. Optionally, the base station can further calibrate each digital reception channel, that is, adjust the amplitude and phase error generated when the same digital reception channel receives transmission signals at different frequencies.

Figure 5:
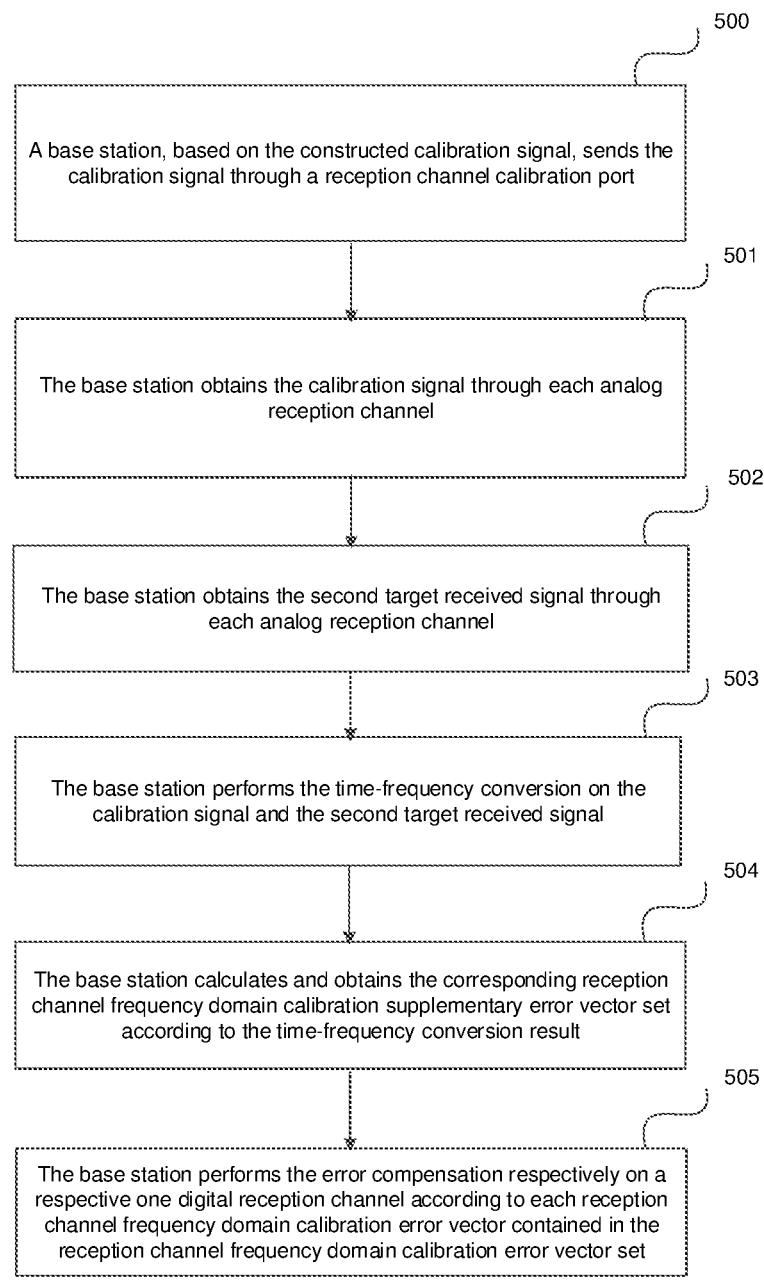
FIG. 5 is a schematic diagram of a calibration compensation process of a digital reception channel in an embodiment of the present application.

Referring to FIG. 5, in embodiments of the present application, the detailed process of calibration and compensation for the digital reception channels is as follows.

Step 500: a base station, based on the constructed calibration signal $s_0$, sends the calibration signal $s_0$ through a reception channel calibration port.

The base station may use the ZC sequence to construct a calibration signal $s_0$, and then send the calibration signal $s_0$ through the reception channel calibration port.

Step 501: the base station obtains the calibration signal $s_0$ through each analog reception channel.

In embodiments of the present application, after sending the calibration signal $s_0$ through the reception channel calibration port, the base station can receive the calibration signal $s_0$ through the analog reception channels included in each sub-array in the 0° beam direction. The base station receives the calibration signal $s_0$ through each analog reception channel corresponding to the digital reception channel 1, receives the calibration signal $s_0$ through each analog reception channel corresponding to the digital reception channel 2, ..., and receives the calibration signal $s_0$ through each analog reception channel corresponding to the digital reception channel P.

Step 502: the base station obtains the second target received signal $x_0^{(p)}$ through each analog reception channel.

In embodiments of the present application, after receiving the calibration signal $s_0$ through the analog reception channels corresponding to each digital reception channel, the base station can obtain the second target received signal $x_0^{(p)}$ through each analog reception channel.

Step 503: the base station performs the time-frequency conversion on the calibration (p) signal $s_0$ and the second target received signal $x_0^{(p)}$.

In embodiments of the present application, the base station performs the time-frequency conversion on the calibration signal $s_0$ to obtain the frequency-domain sequences $S_0=F[s_0]$ (p=1, 2, ..., P) corresponding to the calibration signal $s_0$, F[ ] represents the Fourier transform.

Next, the base station performs the Fourier transform on the second target received signal $x_0^{(p)}$, and then the received frequency-domain sequence $X_0^p$ corresponding to the second target received signal $x_0^{(p)}$ can be expressed as $X_0^p=F[x_0^{(p)}]$, where p=1, 2, ..., P.

Step 504: the base station calculates and obtains the corresponding reception channel frequency domain calibration supplementary error vector set $H_0'$ according to the time-frequency conversion result.

Taking any second target received signal $x_0^{(p)}$ as an example, the base station calculates and obtains the reception channel frequency domain calibration supplementary error vector H corresponding to the second target received signal $x_0^{(p)}$ according to the received signal frequency domain sequence $X_0^p$ corresponding to $x_0^{(p)}$, $H_p'=s_0 \odot X_0^p$ (p=1, 2, ..., P), "⊙" represents the division operation of corresponding elements at the same position. $H_p$ (p=1, 2, ..., P) is calculated in the same way.

Step 505: the base station performs the error compensation respectively on the corresponding digital reception channel according to each reception channel frequency domain calibration error vector contained in the reception channel frequency domain calibration error vectors $H_p$ (p=1, 2, ..., P).

In embodiments of the present application, the reception channel frequency domain calibration error vector $H_p$ (p=1, 2, ..., P) contains P error vectors, which correspond to P digital reception channels respectively. Therefore, after obtaining the reception channel frequency domain calibration error vector $H_p$ (p=1, 2, ..., P), the base station can compensate the reception channel frequency domain calibration error vector corresponding to each digital reception channel to the broadband modulation signal received by the each digital reception channel in the frequency domain, to complete the frequency-domain amplitude and phase calibration compensation of the digital reception channel.

So far, each analog reception channel and each digital reception channel in the base station have been calibrated.

Figure 6:
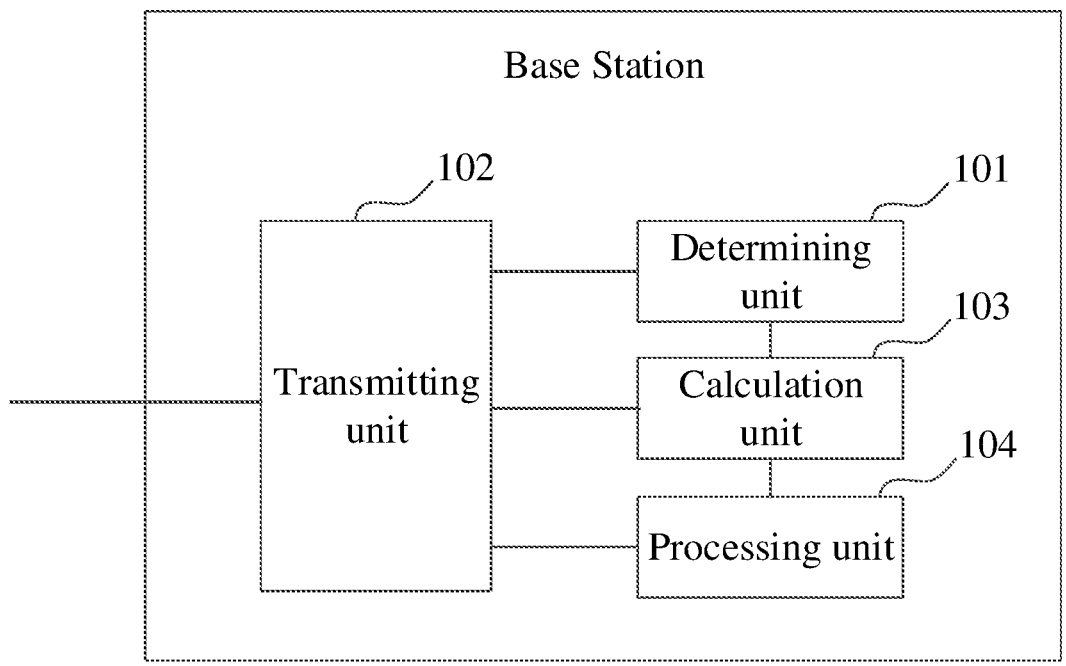
FIG. 6 is a schematic diagram of a logical structure of a first function of a base station in an embodiment of the present application.

In embodiments of the present application, as shown in FIG. 6, a base station includes at least: a determining unit 101, a transmitting unit 102, a calculation unit 103 and a processing unit 104. The determining unit 101 is configured to determine a preset calibration weight vector matrix W and a preset first calibration signal matrix S, where $W^H W=NI_N$, $S^H S=NI_P$, $I_N$ and $I_P$ represent N-dimensional unit matrix and P-dimensional unit matrix respectively, the N is the total number of analog transmission channels corresponding to one digital transmission channel, and P represents the total number of digital transmission channels. The transmitting unit 102 is configured to transmit a respective one calibration signal in the first calibration signal matrix S through analog transmission channels corresponding to each digital transmission channel N times consecutively. Each transmission uses one calibration weight vector in the calibration weight vector matrix W. The calculation unit 103 is configured to construct a corresponding first received data vector matrix $Y_{TX}$ based on all received signals obtained, and calculate a corresponding transmission channel error matrix $E_{TX}$ according to the calibration weight vector matrix W, the first calibration signal matrix S and the first received data vector matrix $Y_{TX}$. The processing unit 104 is configured to perform an error compensation on a corresponding analog transmission channel respectively according to each element contained in the transmission channel error matrix $E_{TX}$.

Optionally, when presetting the calibration weight vector matrix W, the determining unit 101 is configured to: set N calibration weight vectors according to a preset beam scanning range: $w_1, w_2, \ldots, w_N$. The N calibration weight vectors satisfy $w_m^H w_n = 0$ and $\|w_m\|^2 = \|w_n\|^2 = N$, $1 \leq m, n \leq N$, $m \neq n$, where "$[\cdot]^H$" represents a conjugate transposition operation, and "$\|\cdot\|^2$" represents a 2-norm operation. The determining unit 101 is further configured to: construct the calibration weight vector matrix W according to the N calibration weight vectors, the calibration weight vector matrix W satisfies $W^H W = NI_N$.

Optionally, when presetting the first calibration signal matrix S, the determining unit 101 is configured to: use a ZC sequence to construct P calibration signals: $s_1(t) s_2(t), \ldots, s_P(t)$, which satisfy $E\{s_p(t) s_p^*(t)\} = \sigma_0^2$ $E\{s_m(t) s_n^*(t)\} = 0$, $1 \leq p \leq P$, $1 \leq m, n \leq N$, $m \neq n$, where $E\{\}$ represents a mathematical expectation operation, $\sigma_0^2$ represents a preset power value, and "*" represents a conjugate operation; and construct the first calibration signal matrix S according to the P calibration signals, where the first calibration signal matrix S satisfies $S^H S = NI_P$.

Optionally, when transmitting the corresponding calibration signals in the first calibration signal matrix S through analog transmission channels corresponding to each digital transmission channel N times consecutively, wherein each transmission uses one calibration weight vector in the calibration weight vector matrix W, the transmitting unit 102 is configured to: use each calibration weight vector contained in the calibration weight vector matrix W respectively to perform following operations: read a calibration weight vector, and use the currently read calibration weight vector to transmit the corresponding calibration signal in the first calibration signal matrix S respectively through analog transmission channels corresponding to each digital transmission channel, wherein analog transmission channels corresponding to one digital transmission channel are used to transmit a kind of calibration signals in the first calibration signal matrix S.

Optionally, when constructing the corresponding first received data vector matrix $T_{TX}$ based on all received signals obtained, the calculation unit 103 is configured to: obtain a corresponding received data vector based on a formula of $y_n = x_n^T S^H$ each time it obtains a received signal, wherein $x_n$ represents the received signal, $y_n$ represents the received data vector, $1 \leq n \leq N$, $x_n^T$ represents a matrix transposition operation of the received signal and $S^H$ represents a conjugate transposition operation of the first calibration signal matrix S; and construct the corresponding first received data vector matrix $Y_{TX}$ based on all received data vectors obtained.

Optionally, the processing unit 104 is further configured to: transmit corresponding calibration signals in the first calibration signal matrix S through analog transmission channels corresponding to each digital transmission channel N times consecutively; receive corresponding target received signals $x_0$; perform time-frequency conversion on the first calibration signal matrix S and the target received signals $x_0$ to obtain a corresponding calibration signal frequency domain sequence $S_p$ and a received signal frequency domain sequence set $X_0^P$; calculate a corresponding transmission channel frequency domain calibration supplementary error vector $H_p$ ($p = 1, 2, \ldots, P$) based on the obtained calibration signal frequency domain sequence $S_p$ and the received signal frequency domain sequence set $X_0^P$; and perform an error compensation respectively on a corresponding digital transmission channel according to each channel error value contained in the transmission channel frequency domain calibration supplementary error vector $H_p$ ($p = 1, 2, \ldots, P$).

Figure 7:
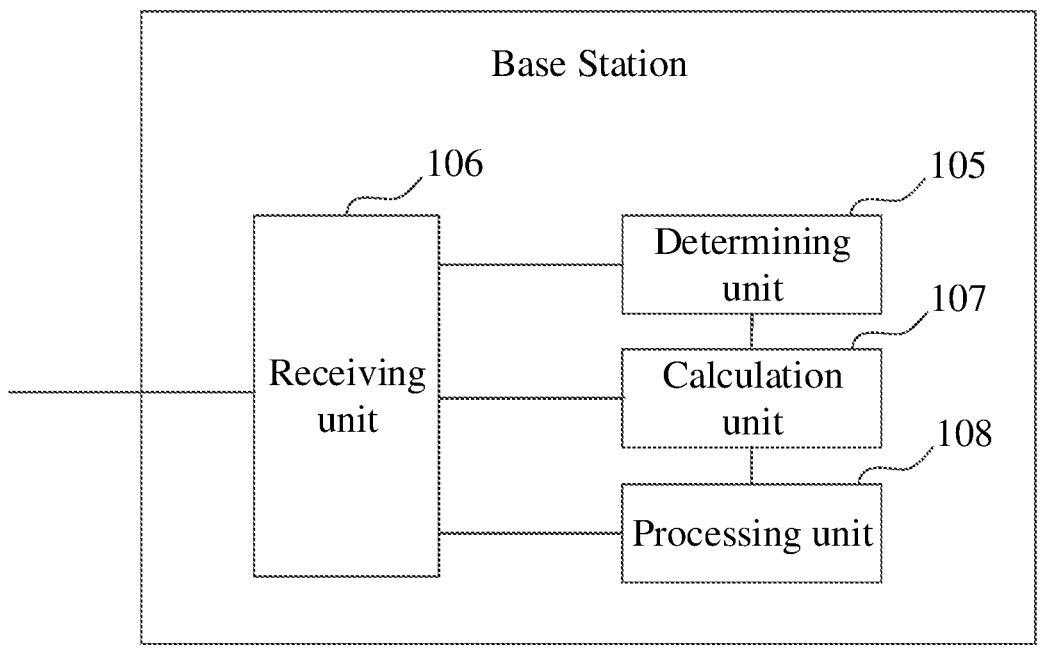
FIG. 7 is a schematic diagram of a logical structure of a second function of the base station in an embodiment of the present application.

In embodiments of the present application, as shown in FIG. 7, a base station includes at least: a determining unit 105, a receiving unit 106, a calculation unit 107 and a processing unit 108. The determining unit 105 is configured to determine a preset calibration weight vector matrix W and a preset calibration signal $s_0$, wherein $W^H W = NI_N$, and the N is the total number of analog reception channels corresponding to one digital reception channel. The receiving unit 106 is configured to receive the calibration signal $s_0$ through the analog reception channels N times consecutively, wherein each reception uses one calibration weight vector in the calibration weight vector matrix W. The calculation unit 107 is configured to construct a corresponding second received data vector matrix $Y_{RX}$ based on all received signals obtained, and calculate a corresponding reception channel error matrix $E_{RX}$ according to the calibration signal $s_0$ and the second received data vector matrix $Y_{RX}$. The processing unit 108 is configured to perform an error compensation on a corresponding analog reception channel respectively according to each element contained in the reception channel error matrix $E_{RX}$.

Optionally, when presetting the calibration weight vector matrix W, the determining unit 105 is configured to: set N calibration weight vectors according to a preset beam scanning range: $w_1, w_2, \ldots, w_N$, wherein the N calibration weight vectors satisfy $w_m^H w_n = 0$ and $\|w_m\|^2 = \|w_n\|^2 = N$, $1 \leq m, n \leq N$, $m \neq n$, wherein "$[\cdot]^H$" represents a conjugate transposition operation, and "$\|\cdot\|^2$" represents a 2-norm operation; and construct the calibration weight vector matrix W according to the N calibration weight vectors, wherein the calibration weight vector matrix W satisfies $W^H W = NI_N$.

Optionally, when presetting the calibration signal $s_0$, the determining unit 105 is configured to use a ZC sequence to construct the calibration signal $s_0$.

Optionally, when receiving the calibration signal $s_0$ through the analog reception channels N times consecutively, wherein each reception uses one calibration weight vector in the calibration weight vector matrix W, the receiving unit 106 is configured to: use each calibration weight vector contained in the calibration weight vector matrix W respectively to perform following operations: read a calibration weight vector, and use the currently read calibration weight vector to receive the calibration signal $s_0$ respectively through analog reception channels corresponding to each digital reception channel.

Optionally, when constructing the corresponding second received data vector matrix $Y_{RX}$ based on all received signals obtained, the calculation unit 107 is configured to: obtain a corresponding received data vector based on a formula of $y_n = x_n s_0^H$ after obtaining the received signals, wherein $X_n$ represents a received signal matrix, $y_n$ represents the received data vector, $1 \leq n \leq N$, and $s_0^H$ represents a conjugate transposition operation of the calibration signal $s_0$; and construct the corresponding second received data vector matrix $Y_{RX}$ based on all received data vectors obtained.

Optionally, the processing unit 108 is further configured to: receive the calibration signal $s_0$ through analog reception channels corresponding to each digital reception channel N times consecutively; receive a corresponding second target received signal $x_0^{(p)}$; perform time-frequency conversion on the calibration signal $s_0$ and the second target received signal $x_0^{(p)}$ to obtain a corresponding calibration signal frequency domain sequence $s_0$ and a received signal frequency domain sequence set $X_0^P$; calculate a corresponding reception channel frequency domain calibration supplementary error vector $H_p$ (p=1, 2, . . . , P) based on the obtained calibration signal frequency domain sequence $s_0$ and the received signal frequency domain sequence set $X_0^P$; and perform an error compensation respectively on a corresponding digital reception channel according to each channel error value contained in the reception channel frequency domain calibration supplementary error vector $H_p$ (p=1, 2, . . . , P).

Figure 8:
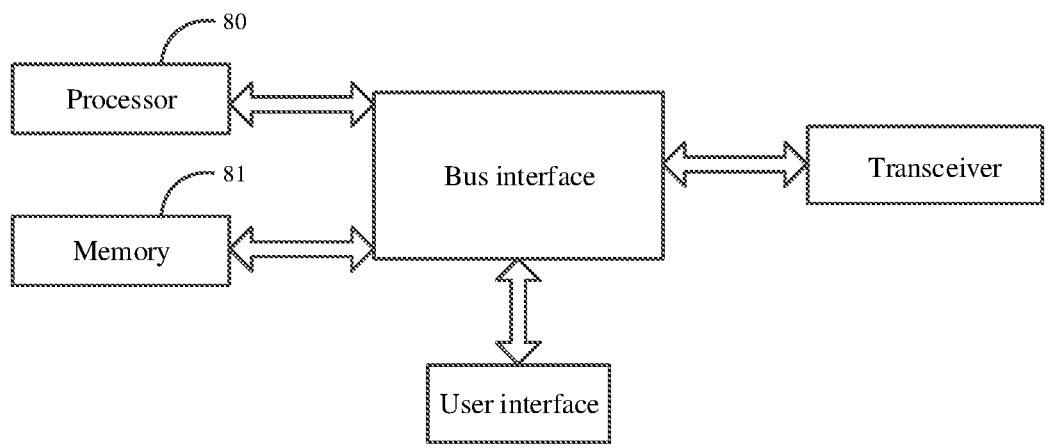
FIG. 8 is a schematic diagram of an entity structure of a first function of the base station in an embodiment of the present application.

Based on the same inventive concept, embodiments of the present application provide a base station. As shown in FIG. 8, the base station includes at least a processor 80 and a memory 81. The processor 80 is configured to read a program stored in the memory 81 and perform the operations of: determining a preset calibration weight vector matrix W and a preset first calibration signal matrix S, wherein $W^H W = NI_N$, $S^H S = NI_P$, $I_N$ and $I_P$ represent N-dimensional unit matrix and P-dimensional unit matrix respectively, the N is the total number of analog transmission channels corresponding to one digital transmission channel, and P represents the total number of digital transmission channels; transmitting corresponding calibration signals in the first calibration signal matrix S through analog transmission channels corresponding to each digital transmission channel N times consecutively, wherein each transmission uses one calibration weight vector in the calibration weight vector matrix W; constructing a first received data vector matrix $T_{TX}$ based on all received signals obtained, and calculating a transmission channel error matrix $E_{TX}$ according to the calibration weight vector matrix W, the first calibration signal matrix S and the first received data vector matrix $Y_{TX}$; and performing an error compensation on a corresponding analog transmission channel respectively according to each element contained in the transmission channel error matrix $E_{TX}$.

Optionally, when presetting the calibration weight vector matrix W, the processor 80 is configured to: set N calibration weight vectors according to a preset beam scanning range: $w_1, w_2, \ldots, w_N$, the N calibration weight vectors satisfy $w_m^H w_n = 0$ and $\|w_m\|^2 = \|w_n\|^2 = N$, $1 \leq m,n \leq N$, $m \neq n$, wherein "$[\cdot]^H$" represents a conjugate transposition operation, and "$\|\cdot\|^2$" represents a 2-norm operation; and construct the calibration weight vector matrix W according to the N calibration weight vectors, wherein the calibration weight vector matrix W satisfies $W^H W = NI_N$.

Optionally, when presetting the first calibration signal matrix S, the processor 80 is configured to: use a ZC sequence to construct P calibration signals: $s_1(t), s_2(t), \ldots, s_p(t)$, which satisfy $E\{s_p(t) s_p^*(t)\} = \sigma_0^2$, $E\{s_m(t) s_n^*(t)\} = 0$, $1 \leq p \leq P$, $1 \leq m,n \leq N$, $m \neq n$, wherein $E\{\ \}$ represents a mathematical expectation operation, $\sigma_0^2$ represents a preset power value, and "*" represents a conjugate operation; and construct the first calibration signal matrix S according to the P calibration signals, wherein the first calibration signal matrix S satisfies $S^H S = NI_P$.

Optionally, when transmitting the corresponding calibration signals in the first calibration signal matrix S through analog transmission channels corresponding to each digital transmission channel N times consecutively, wherein each transmission uses one calibration weight vector in the calibration weight vector matrix W, the processor 80 is configured to: use each calibration weight vector contained in the calibration weight vector matrix W respectively to perform following operations: read a calibration weight vector, and use the currently read calibration weight vector to transmit the corresponding calibration signal in the first calibration signal matrix S respectively through analog transmission channels corresponding to each digital transmission channel, wherein analog transmission channels corresponding to one digital transmission channel are used to transmit a kind of calibration signals in the first calibration signal matrix S.

Optionally, when constructing the corresponding first received data vector matrix $Y_{TX}$ based on all received signals obtained, the processor 80 is configured to: obtain a corresponding received data vector based on a formula of $y_n = x_n^T S^H$ each time it obtains a received signal, wherein $x_n$ represents the received signal, $y_n$ represents the received data vector, $1 \leq n \leq N$, $x_n^T$ represents a matrix transposition operation of the received signal $x_n$, and $S^H$ represents a conjugate transposition operation of the first calibration signal matrix S; and construct the corresponding first received data vector matrix $Y_{TX}$ based on all received data vectors obtained.

Optionally, the processor 80 is further configured to: transmit corresponding calibration signals in the first calibration signal matrix S through analog transmission channels corresponding to each digital transmission channel N times consecutively; receive corresponding target received signals $x_0$; perform time-frequency conversion on the first calibration signal matrix S and the target received signals $x_0$ to obtain a corresponding calibration signal frequency domain sequence $S_p$ and a received signal frequency domain sequence set $X_0^P$; calculate a corresponding transmission channel frequency domain calibration supplementary error vector $H_p$ (p=1, 2, . . . , P) based on the obtained calibration signal frequency domain sequence $S_p$ and the received signal frequency domain sequence set $X_0^P$; and perform an error compensation respectively on a corresponding digital transmission channel according to each channel error value contained in the transmission channel frequency domain calibration supplementary error vector $H_p$ (p=1, 2, . . . , P).

Based on the same inventive concept, embodiments of the present application provide a storage medium storing a program for implementing a hybrid beam forming architecture-based calibration compensation method, where the program, when run by a processor, performs the steps of: determining a preset calibration weight vector matrix W and a preset first calibration signal matrix S, wherein $W^H W = NI_N$, $S^H S = NI_P$, the N is the total number of analog transmission channels corresponding to one digital transmission channel, and P represents the total number of digital transmission channels; transmitting corresponding calibration signals in the first calibration signal matrix S through analog transmission channels corresponding to each digital transmission channel N times consecutively, wherein each transmission uses one calibration weight vector in the calibration weight vector matrix W; constructing a first received data vector matrix $Y_{TX}$ based on all received signals obtained, and calculating a transmission channel error matrix $E_{TX}$ according to the calibration weight vector matrix W, the first calibration signal matrix S and the first received data vector matrix $Y_{TX}$; and performing an error compensation on a corresponding analog transmission channel respectively according to each element contained in the transmission channel error matrix $E_{TX}$.

Figure 9:
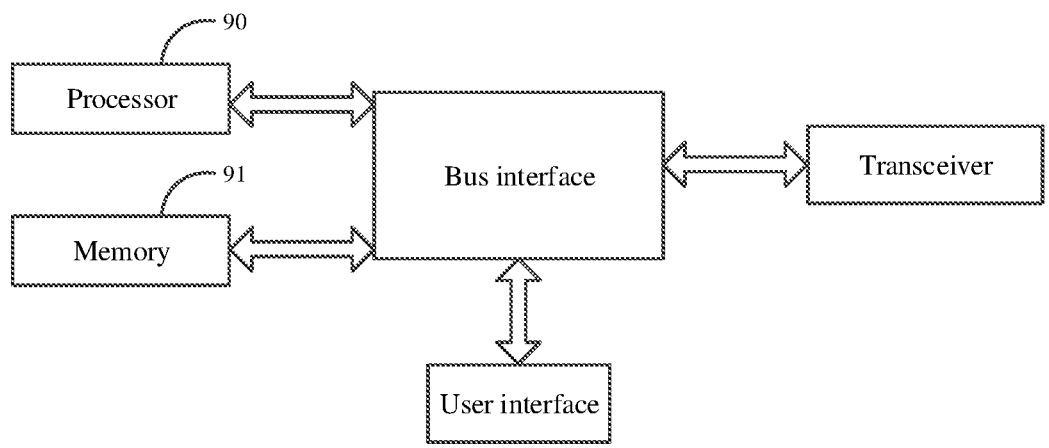
FIG. 9 is a schematic diagram of an entity structure of a second function of the base station in an embodiment of the present application.

Based on the same inventive concept, embodiments of the present application provide a base station. As shown in FIG. 9, the base station at least includes a processor 90 and a memory 91, wherein the processor 90 is configured to read a program stored in the memory 91 and perform the operations of: determining a preset calibration weight vector matrix W and a preset calibration signal $s_0$, wherein $W^H W = NI_N$, and the N is the total number of analog reception channels corresponding to one digital reception channel; receiving the calibration signal $s_0$ through the analog reception channels N times consecutively, wherein each reception uses one calibration weight vector in the calibration weight vector matrix W; constructing a corresponding second received data vector matrix $Y_{RX}$ based on all received signals obtained, and calculating a corresponding reception channel error matrix $E_{RX}$ according to the calibration signal $s_0$ and the second received data vector matrix $Y_{RX}$; and performing an error compensation on a corresponding analog reception channel respectively according to each element contained in the reception channel error matrix $E_{RX}$.

Optionally, when presetting the calibration weight vector matrix W, the processor 90 is configured to: set N calibration weight vectors according to a preset beam scanning range: $w_1, w_2, \ldots, w_N$, wherein the N calibration weight vectors satisfy $w_m^H w_n = 0$ and $\|w_m\|^2 = \|w_n\|^2 = N$, $1 \leq m, n \leq N$, $m \neq n$, wherein "$[\cdot]^H$" represents a conjugate transposition operation, and "$\|\cdot\|^2$" represents a 2-norm operation; and construct the calibration weight vector matrix W according to the N calibration weight vectors, wherein the calibration weight vector matrix W satisfies $W^H W = NI_N$.

Optionally, when presetting the calibration signal $s_0$ the processor 90 is configured to use a ZC sequence to construct a calibration signal $s_0$.

Optionally, when receiving the calibration signal $s_0$ through the analog reception channels N times consecutively, wherein each reception uses one calibration weight vector in the calibration weight vector matrix W, the processor 90 is configured to: use each calibration weight vector contained in the calibration weight vector matrix W respectively to perform following operations: read a calibration weight vector, and use the currently read calibration weight vector to receive the calibration signal $s_0$ respectively through analog reception channels corresponding to each digital reception channel.

Optionally, when constructing the corresponding second received data vector matrix $Y_{RX}$ based on all received signals obtained, the processor 90 is configured to: obtain a corresponding received data vector based on a formula of $y_n = X_n s_0^H$ after obtaining the received signals, wherein $X_n$ represents a received signal matrix, $y_n$ represents the received data vector, $1 \leq n \leq N$, and $s_0^H$ represents a conjugate transposition operation of the calibration signal $s_0$; and construct the corresponding second received data vector matrix $Y_{RX}$ based on all received data vectors obtained.

Optionally, the processor 90 is further configured to: receive the calibration signal $s_0$ through analog reception channels corresponding to each digital reception channel N times consecutively; receive a corresponding second target received signal $X_0^{(p)}$; perform time-frequency conversion on the calibration signal $s_0$ and the second target received signal $x_0^{(p)}$ to obtain a corresponding calibration signal frequency domain sequence S, and a received signal frequency domain sequence set $X_0^p$; calculate a corresponding reception channel frequency domain calibration supplementary error vector $H_p$ ($p=1, 2, \ldots, P$) based on the obtained calibration signal frequency domain sequence $s_0$ and the received signal frequency domain sequence set $X_0^p$; and perform an error compensation respectively on a corresponding digital reception channel according to each channel error value contained in the reception channel frequency domain calibration supplementary error vector $H_p$ ($p=1, 2, \ldots, P$).

Based on the same inventive concept, embodiments of the present application provide a storage medium storing a program for implementing a hybrid beam forming architecture-based calibration compensation method, where the program, when run by a processor, performs the steps of: determining a preset calibration weight vector matrix W and a preset calibration signal $s_0$, wherein $W^H W = NI_N$, and the N is the total number of analog reception channels corresponding to one digital reception channel; receiving the calibration signal $s_0$ through the analog reception channels N times consecutively, wherein each reception uses one calibration weight vector in the calibration weight vector matrix W; constructing a corresponding second received data vector matrix $Y_{RX}$ based on all received signals obtained, and calculating a corresponding reception channel error matrix $E_{RX}$ according to the calibration signal $s_0$ and the second received data vector matrix $Y_{RX}$; and performing an error compensation on a corresponding analog reception channel respectively according to each element contained in the reception channel error matrix $E_{RX}$.

In summary, in the embodiments of the present application, firstly the base station determines a preset calibration weight vector matrix W and a preset first calibration signal matrix S, then transmits the corresponding calibration signal in the first calibration signal matrix S through analog transmission channels corresponding to each digital transmission channel N times consecutively, then constructs a first received data vector matrix $Y_{TX}$ and calculates the corresponding transmission channel error matrix $E_{TX}$ according to the calibration weight vector matrix W, the first calibration signal matrix S and the first received data vector matrix $Y_{TX}$, and finally performs the error compensation on the corresponding analog transmission channel according to $E_{TX}$. In this way, the base station can utilize the special properties of the calibration weight vector matrix to avoid the high-dimensional matrix inversion operation, reduce the computational burden of the system, and improve the system operating efficiency; and transmit the calibration signals through analog transmission channels N times consecutively, to significantly reduce the switching times of analog transmission channels, and reduce the computing resources and computational complexity; and then perform the error compensation on the corresponding analog transmission channel according to the calculated transmission channel error matrix $E_{TX}$, to ensure that the amplitude and phase errors of each analog transmission channel are compensated, improve the accuracy and effectiveness of calibration compensation method, and increase the precision of error compensation.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the embodiments of the present application without departing from the spirit and scope of the embodiments of the present application. Thus the present application is also intended to encompass these modifications and variations therein as long as these modifications and variations to the embodiments of the present application come into the scope of the claims of the present application and their equivalents.

What is claimed is:

1. A hybrid beam forming architecture-based calibration compensation method, comprising:
    determining, by a base station, a preset calibration weight vector matrix W and a preset first calibration signal matrix S, wherein $W^H W=NI_N$, $S^H S=NI_P$, $I_N$ and $I_P$ represent N-dimensional unit matrix and P-dimensional unit matrix respectively, the N is a total quantity of analog transmission channels corresponding to one digital transmission channel, and P represents a total quantity of digital transmission channels;
    transmitting N times consecutively, by the base station, a respective one of calibration signals in the preset first calibration signal matrix S through analog transmission channels corresponding to each of the digital transmission channels, a respective one of calibration weight vectors in the preset calibration weight vector matrix W being used in each of the N times of the transmitting;
    constructing, by the base station, a first received data vector matrix $Y_{TX}$ based on all received signals obtained, and calculating a transmission channel error matrix $E_{TX}$ according to the calibration weight vector matrix W, the first calibration signal matrix S and the first received data vector matrix $Y_{TX}$;
    performing, by the base station, an error compensation on a respective one analog transmission channel according to each element contained in the transmission channel error matrix $E_{TX}$.

2. The method of claim 1, wherein said determining, by the base station, the preset calibration weight vector matrix W, comprises:
    setting according to a preset beam scanning range, by the base station, N calibration weight vectors: $w_1$, $w_2$, ..., $w_N$, wherein the N calibration weight vectors satisfy $w_m^H w_n=0$ and $|w_m|^2=|w_n|^2=N$, $1\leq m,n\leq N$, $m\neq n$, wherein "$[\cdot]^H$" represents a conjugate transposition operation, and "$\|\cdot\|^2$" represents a 2-norm operation;
    constructing, by the base station, the preset calibration weight vector matrix W according to the N calibration weight vectors, wherein the preset calibration weight vector matrix W satisfies $W^H W=NI_N$.

3. The method of claim 1, wherein said determining, by the base station, the preset first calibration signal matrix S, comprises:
    constructing by using a Zadoff-Chu, ZC, sequence, by the base station, P calibration signals: $s_1(t), s_2(t), \ldots, s_P(t)$, wherein the P calibration signals satisfy $E\{s_p(t)s_p^*(t)\}=\sigma_0^2$, $E\{s_m(t)s_n^*(t)\}=0$, $1\leq p\leq P$, $1\leq m,n\leq N$, $m\neq n$, wherein $E\{\}$ represents a mathematical expectation operation, $\sigma_0^2$ represents a preset power value, and "*" represents a conjugate operation;
    constructing, by the base station, the preset first calibration signal matrix S according to the P calibration signals, wherein the preset first calibration signal matrix S satisfies $S^H S=NI_P$.

4. The method of claim 1, wherein said transmitting N times consecutively, by the base station, a respective one of calibration signals in the preset first calibration signal matrix S through analog transmission channels corresponding to each of the digital transmission channels, a respective one of calibration weight vectors in the preset calibration weight vector matrix W being used in each of the N times of the transmitting, comprises:
    using, by the base station, each of the calibration weight vectors contained in the preset calibration weight vector matrix W respectively to perform following operations:
    reading, by the base station, one of the calibration weight vectors; and
    transmitting by using a currently read one of the calibration weight vectors, by the base station, a respective one of the calibration signals in the preset first calibration signal matrix S through analog transmission channels corresponding to each digital transmission channel, wherein analog transmission channels corresponding to one digital transmission channel are used to transmit one kind of calibration signals in the preset first calibration signal matrix S.

5. The method of claim 4, wherein said constructing, by the base station, the first received data vector matrix $Y_{TX}$ based on all received signals obtained, comprises:
    obtaining, by the base station, a received data vector based on a formula of $y_n=x_n^T S^H$ each time the base station obtains a received signal, wherein $x_n$ represents the received signal, $y_n$ represents the received data vector, $1\leq n\leq N$, $x_n^T$ represents a matrix transposition operation of the received signal $x_n$, and $S^H$ represents a conjugate transposition operation of the preset first calibration signal matrix S;

constructing, by the base station, the first received data vector matrix $Y_{TX}$ based on all received data vectors obtained.

6. The method of claim 4, further comprising:
transmitting N times consecutively, by the base station, a respective one of the calibration signals in the preset first calibration signal matrix S through analog transmission channels corresponding to each of the digital transmission channels;
receiving, by the base station, corresponding target received signals $x_0$;
performing, by the base station, time-frequency conversion on the preset first calibration signal matrix S and the target received signals $x_0$ to obtain a calibration signal frequency domain sequence $S_p$ and a received signal frequency domain sequence set $X_0^P$;
calculating, by the base station, a transmission channel frequency domain calibration supplementary error vector $H_p$ (p=1, 2, . . . , P) based on the obtained calibration signal frequency domain sequence $S_p$ and the received signal frequency domain sequence set $X_0^P$;
performing, by the base station, an error compensation on a respective one of the digital transmission channels according to each channel error value contained in the transmission channel frequency domain calibration supplementary error vector $H_p$ (p=1, 2, . . . , P).

7. A hybrid beam forming architecture-based calibration compensation method, comprising:
determining, by a base station, a preset calibration weight vector matrix W and a preset calibration signal $s_0$, wherein $W^H W=NI_N$, and the N is a total quantity of analog reception channels corresponding to one digital reception channel;
receiving, by the base station, the calibration signal $s_0$ through the analog reception channels N times consecutively, one of calibration weight vectors in the preset calibration weight vector matrix W being used during each of the N times of the receiving;
constructing, by the base station, a second received data vector matrix $Y_{RX}$ based on all received signals obtained, and calculating a reception channel error matrix $E_{RX}$ according to the calibration signal $s_0$ and the second received data vector matrix $Y_{RX}$;
performing, by the base station, an error compensation on a respective one of analog reception channels according to each element contained in the reception channel error matrix $E_{RX}$.

8. The method of claim 7, wherein said determining, by the base station, the preset calibration weight vector matrix W, comprises:
setting according to a preset beam scanning range, by the base station, N calibration weight vectors: $w_1$, $w_2$, . . . , $w_N$, wherein the N calibration weight vectors satisfy $w_m^H w_n=0$ and $\|w_m\|^2=\|w_n\|^2=N$, $1 \leq m,n \leq N$, $m \neq n$, wherein "$[\cdot]^H$" represents a conjugate transposition operation, and "$\|\cdot\|^2$" represents a 2-norm operation;
constructing, by the base station, the preset calibration weight vector matrix W according to the N calibration weight vectors, wherein the preset calibration weight vector matrix W satisfies $W^H W=NI_N$.

9. The method of claim 7, wherein said determining, by the base station, the calibration signal $s_0$, comprises:
constructing by using a Zadoff-Chu, ZC, sequence, by the base station, the calibration signal $s_0$.

10. The method of claim 7, wherein said receiving, by the base station, the calibration signal through the analog reception channels N times consecutively, one of calibration weight vectors in the preset calibration weight vector matrix W being used during each of the N times of the receiving, comprises:
using, by the base station, each of the calibration weight vectors contained in the preset calibration weight vector matrix W respectively to perform following operations:
reading, by the base station, one of the calibration weight vectors, and
receiving by using a currently read one of the calibration weight vectors, by the base station, the calibration signal through analog reception channels corresponding to each digital reception channel.

11. The method of claim 10, wherein said constructing, by the base station, the second received data vector matrix $Y_{RX}$ based on all received signals obtained, comprises:
obtaining, by the base station, a received data vector based on a formula of $y_n=X_n s_0^H$ after obtaining the received signals, wherein $X_n$ represents a matrix of the received signals, $y_n$ represents the received data vector, $1 \leq n \leq N$, and $s_0^H$ represents a conjugate transposition operation of the calibration signal $s_0$;
constructing, by the base station, the second received data vector matrix $Y_{RX}$ based on all received data vectors obtained.

12. The method of claim 10, further comprising:
receiving, by the base station, the calibration signal $s_0$ through analog reception channels corresponding to each digital reception channel N times consecutively;
receiving, by the base station, corresponding second target received signals $x_0^{(p)}$;
performing, by the base station, time-frequency conversion on the calibration signal $s_0$ and the second target received signals $x_0^{(p)}$ to obtain a calibration signal frequency domain sequence $s_0$ and a received signal frequency domain sequence set $X_0^P$;
calculating, by the base station, a reception channel frequency domain calibration supplementary error vector $H_p$ (p=1, 2, . . . , P) based on the obtained calibration signal frequency domain sequence $S_0$ and the received signal frequency domain sequence set $X_0^P$;
performing, by the base station, an error compensation respectively on a respective one of the digital reception channels according to each of channel error values contained in the reception channel frequency domain calibration supplementary error vector $H_p$ (p=1, 2, . . . , P).

13. A base station, comprising a processor and a memory, wherein the processor is configured to read a program stored in the memory and perform operations of:
determining a preset calibration weight vector matrix W and a preset first calibration signal matrix S, wherein $W^H W=NI_N$, $S^H S=NI_P$, $I_N$ and $I_P$ represent N-dimensional unit matrix and P-dimensional unit matrix respectively, the N is a total quantity of analog transmission channels corresponding to one digital transmission channel, and P represents a total quantity of digital transmission channels;
transmitting, N times consecutively, a respective one of calibration signals in the preset first calibration signal matrix S through analog transmission channels corresponding to each of the digital transmission channels, wherein a respective one of calibration weight vectors in the preset calibration weight vector matrix W being used in each of the N times of the transmitting;
constructing a first received data vector matrix $Y_{TX}$ based on all received signals obtained, and calculating a transmission channel error matrix $E_{TX}$ according to the calibration weight vector matrix W, the first calibration signal matrix S and the first received data vector matrix $Y_{TX}$;

performing an error compensation on a respective one analog transmission channel according to each element contained in the transmission channel error matrix $E_{TX}$.

14. The base station according to claim 13, wherein the processor is further configured to read a program stored in the memory and perform any one or all of following operation I and operation II:

operation I:
setting, according to a preset beam scanning range, N calibration weight vectors: $w_1, w_2, \ldots, w_N$, wherein the N calibration weight vectors satisfy $w_m^H w_n=0$ and $\|w_m\|^2=\|w_n\|^2=N$, $1 \leq m,n \leq N$, $m \neq n$, wherein "$[\cdot]^H$" represents a conjugate transposition operation, and "$\|\cdot\|^2$" represents a 2-norm operation;

constructing the preset calibration weight vector matrix W according to the N calibration weight vectors, wherein the preset calibration weight vector matrix W satisfies $W^H W=NI_N$;

operation II:
constructing, by using a Zadoff-Chu, ZC, sequence, P calibration signals: $s_1(t), s_2(t), \ldots, s_P(t)$; wherein the P calibration signals satisfy $E\{s_p(t)s_p^*(t)\}=\sigma_0^2$, $E\{s_m(t)s_n^*(t)\}=0$, $1 \leq p \leq P$, $1 \leq m,n \leq N$, $m \neq n$, wherein $E\{\ \}$ represents a mathematical expectation operation, $\sigma_0^2$ represents a preset power value, and "*" represents a conjugate operation;

constructing the preset first calibration signal matrix S according to the P calibration signals, wherein the preset first calibration signal matrix S satisfies $S^H S=NI_P$.

15. The base station according to claim 13, wherein the processor is further configured to read a program stored in the memory and perform operations of:

using each of the calibration weight vectors contained in the preset calibration weight vector matrix W respectively to perform following operations:

reading one of the calibration weight vectors; and transmitting, by using a currently read one of the calibration weight vectors, a respective one of the calibration signals in the preset first calibration signal matrix S through analog transmission channels corresponding to each digital transmission channel, wherein analog transmission channels corresponding to one digital transmission channel are used to transmit one kind of calibration signals in the preset first calibration signal matrix S.

16. The base station according to claim 15, wherein the processor is further configured to read a program stored in the memory and perform operations of:

transmitting, N times consecutively, a respective one of the calibration signals in the preset first calibration signal matrix S through analog transmission channels corresponding to each of the digital transmission channels;

receiving corresponding target received signals $x_0$;

performing time-frequency conversion on the preset first calibration signal matrix S and the target received signals $x_0$ to obtain a calibration signal frequency domain sequence $S_p$ and a received signal frequency domain sequence set $X_0^p$;

calculating a transmission channel frequency domain calibration supplementary error vector $H_p$ (p=1, 2, ..., P)

based on the obtained calibration signal frequency domain sequence $S_p$ and the received signal frequency domain sequence set $X_0^p$;

performing an error compensation on a respective one of the digital transmission channels according to each channel error value contained in the transmission channel frequency domain calibration supplementary error vector $H_p$ (p=1, 2, ..., P).

17. A base station, comprising a processor and a memory, wherein the processor is configured to read a program stored in the memory and perform operations of:

determining a preset calibration weight vector matrix W and a preset calibration signal $s_0$, wherein $W^H W=NI_N$, and the N is a total quantity of analog reception channels corresponding to one digital reception channel;

receiving the calibration signal $s_0$ through the analog reception channels N times consecutively, one of calibration weight vectors in the preset calibration weight vector matrix W being used during each of the N times of the receiving;

constructing a second received data vector matrix $Y_{RX}$ based on all received signals obtained, and calculating a reception channel error matrix $E_{RX}$ according to the calibration signal $s_0$ and the second received data vector matrix $Y_{RX}$;

performing an error compensation on a respective one of analog reception channels according to each element contained in the reception channel error matrix $E_{RX}$.

18. The base station according to claim 17, wherein the processor is further configured to read a program stored in the memory and perform any one or all of following operations I and II:

operation I:
setting, according to a preset beam scanning range, N calibration weight vectors: $w_1, w_2, \ldots, w_N$, wherein the N calibration weight vectors satisfy $w_m^H w_n=0$ and $\|w_m\|^2=\|w_n\|^2=N$, $1 \leq m,n \leq N$, $m \neq n$, wherein "$[\cdot]^H$" represents a conjugate transposition operation, and "$\|\cdot\|^2$" represents a 2-norm operation;

constructing the preset calibration weight vector matrix W according to the N calibration weight vectors, wherein the calibration weight vector matrix W satisfies $W^H W=NI_N$;

operation II:
constructing, by using a Zadoff-Chu, ZC, sequence, the calibration signal $s_0$.

19. The base station according to claim 17, wherein the processor is further configured to read a program stored in the memory and perform operations of:

using each of the calibration weight vectors contained in the preset calibration weight vector matrix W respectively to perform following operations:

reading one of the calibration weight vectors, and receiving, by using a currently read one of the calibration weight vectors, the calibration signal $s_0$ through analog reception channels corresponding to each digital reception channel.

20. The base station according to claim 19, wherein the processor is further configured to read a program stored in the memory and perform operations of:

receiving the calibration signal $s_0$ through analog reception channels corresponding to each digital reception channel N times consecutively;

receiving corresponding second target received signals $x_0^{(p)}$;

performing time-frequency conversion on the calibration signal $s_0$ and the second target received signals $x_0^{(p)}$ to obtain a calibration signal frequency domain sequence $S_0$ and a received signal frequency domain sequence set $X_0^P$;

calculating a reception channel frequency domain calibration supplementary error vector $H_p$ (p=1, 2, ..., P) based on the obtained calibration signal frequency domain sequence $S_0$ and the received signal frequency domain sequence set $X_0^P$;

performing an error compensation respectively on a respective one of the digital reception channels according to each of channel error values contained in the reception channel frequency domain calibration supplementary error vector $H_p$ (p=1, 2, ..., P).

* * * * *